United States Patent
Patel et al.

(10) Patent No.: US 10,740,023 B1
(45) Date of Patent: Aug. 11, 2020

(54) SYSTEM AND METHOD FOR DYNAMIC APPLICATION ACCESS-BASED MAPPING

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 16/261,155

(22) Filed: Jan. 29, 2019

(51) Int. Cl.
- *G06F 11/14* (2006.01)
- *G06F 11/20* (2006.01)
- *G06F 3/06* (2006.01)

(52) U.S. Cl.
CPC ............. *G06F 3/065* (2013.01); *G06F 3/061* (2013.01); *G06F 3/067* (2013.01); *G06F 3/0644* (2013.01); *G06F 3/0653* (2013.01); *G06F 11/2082* (2013.01); *G06F 11/2094* (2013.01)

(58) Field of Classification Search
CPC ............. G06F 11/14; G06F 11/20; G06F 3/06
See application file for complete search history.

(56) References Cited

U.S. PATENT DOCUMENTS

| | | | |
|---|---|---|---|
| 7,987,353 B2 | 7/2011 | Holdaway et al. | |
| 8,099,571 B1 | 1/2012 | Driscoll et al. | |
| 8,161,255 B2 | 4/2012 | Anglin et al. | |
| 8,190,835 B1 | 5/2012 | Yueh | |
| 8,364,917 B2 | 1/2013 | Bricker et al. | |
| 8,386,930 B2 | 2/2013 | Dillenberger et al. | |
| 8,583,769 B1 | 11/2013 | Peters et al. | |
| 8,788,466 B2 | 7/2014 | Anglin et al. | |
| 8,868,987 B2 | 10/2014 | Wagner | |
| 8,874,892 B1 | 10/2014 | Chan et al. | |
| 8,898,114 B1 | 11/2014 | Feathergill et al. | |
| 8,949,208 B1 | 2/2015 | Xu et al. | |
| 9,122,501 B1 | 9/2015 | Hsu et al. | |
| 9,201,751 B1 * | 12/2015 | Muthirisavenugopal | G06F 16/185 |
| 9,278,481 B2 | 3/2016 | Hull | |
| 9,355,036 B2 | 5/2016 | Beard et al. | |
| 9,521,198 B1 | 12/2016 | Agarwala et al. | |
| 9,710,367 B1 | 7/2017 | Nagineni | |
| 9,749,480 B1 | 8/2017 | Katano | |

(Continued)

OTHER PUBLICATIONS

"Make more time for the work that matters most", retrieved on-line Mar. 4, 2019 at https://asana.com/ (5 pages).

(Continued)

*Primary Examiner* — David E Martinez
(74) *Attorney, Agent, or Firm* — Chamberlain, Hrdlicka, White, Williams & Aughtry

(57) ABSTRACT

A data storage system for managing storage of data from clients includes a data storage and a data storage orchestrator. The data storage includes an accelerator pool and a non-accelerator pool. The data storage orchestrator identifies a client assignment update event based on a change in use of the data storage by a client of the clients, makes a determination that the client assignment update event is a promotion event, and in response to the determination: promotes the client to move a primary data storage of the client from the non-accelerator pool to the accelerator pool.

18 Claims, 19 Drawing Sheets

(56) References Cited

U.S. PATENT DOCUMENTS

| | | |
|---|---|---|
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,339,455 B1 * | 7/2019 | Parush-Tzur .......... G06N 20/20 |
| 10,409,778 B1 | 9/2019 | Zhao et al. |
| 10,503,413 B1 | 12/2019 | Gal et al. |
| 2003/0058277 A1 | 3/2003 | Bowman-Amuah |
| 2003/0172145 A1 | 9/2003 | Nguyen |
| 2003/0177205 A1 | 9/2003 | Liang et al. |
| 2005/0076049 A1 | 4/2005 | Qubti et al. |
| 2008/0244204 A1 | 10/2008 | Cremelie et al. |
| 2009/0077165 A1 | 3/2009 | Rhodes et al. |
| 2011/0099351 A1 | 4/2011 | Condict |
| 2011/0246597 A1 | 10/2011 | Swanson et al. |
| 2013/0067459 A1 | 3/2013 | Sannidhanam et al. |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0297603 A1 | 10/2014 | Kim et al. |
| 2015/0058582 A1 | 2/2015 | Baldwin et al. |
| 2015/0161000 A1 | 6/2015 | Kim et al. |
| 2016/0062674 A1 | 3/2016 | Benight et al. |
| 2016/0085630 A1 | 3/2016 | Gardner |
| 2016/0246537 A1 | 8/2016 | Kim |
| 2017/0099187 A1 | 4/2017 | Dale et al. |
| 2017/0160983 A1 | 6/2017 | Fiske et al. |
| 2017/0192868 A1 | 7/2017 | Vijayan et al. |
| 2017/0206034 A1 | 7/2017 | Fetik |
| 2017/0235609 A1 | 8/2017 | Wires et al. |
| 2018/0018235 A1 | 1/2018 | Arslan et al. |
| 2018/0060894 A1 | 3/2018 | Beveridge et al. |
| 2018/0157532 A1 | 6/2018 | Kumar et al. |
| 2018/0189109 A1 | 7/2018 | Nagai et al. |
| 2018/0278597 A1 | 9/2018 | Helms et al. |
| 2018/0307560 A1 | 10/2018 | Vishnumolakala et al. |
| 2018/0322558 A1 | 11/2018 | Padmanabh et al. |
| 2019/0104398 A1 | 4/2019 | Owen et al. |
| 2019/0109772 A1 | 4/2019 | Lipstone et al. |
| 2019/0197023 A1 | 6/2019 | Chennamsetty et al. |
| 2019/0379588 A1 | 12/2019 | Rao |
| 2020/0050689 A1 | 2/2020 | Tal et al. |

OTHER PUBLICATIONS

"Project Management Redefined", retrieved on-line Mar. 4, 2019 at https://www.robohead.net/features-2/ (2 pages).

"Features" Project Management Tools, retrieved on-line Mar. 4, 2019 at https://www.proworkflow.com/features-project-management-tools/ (7 pages).

Suzhen Wu et al. ;"Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028).

* cited by examiner

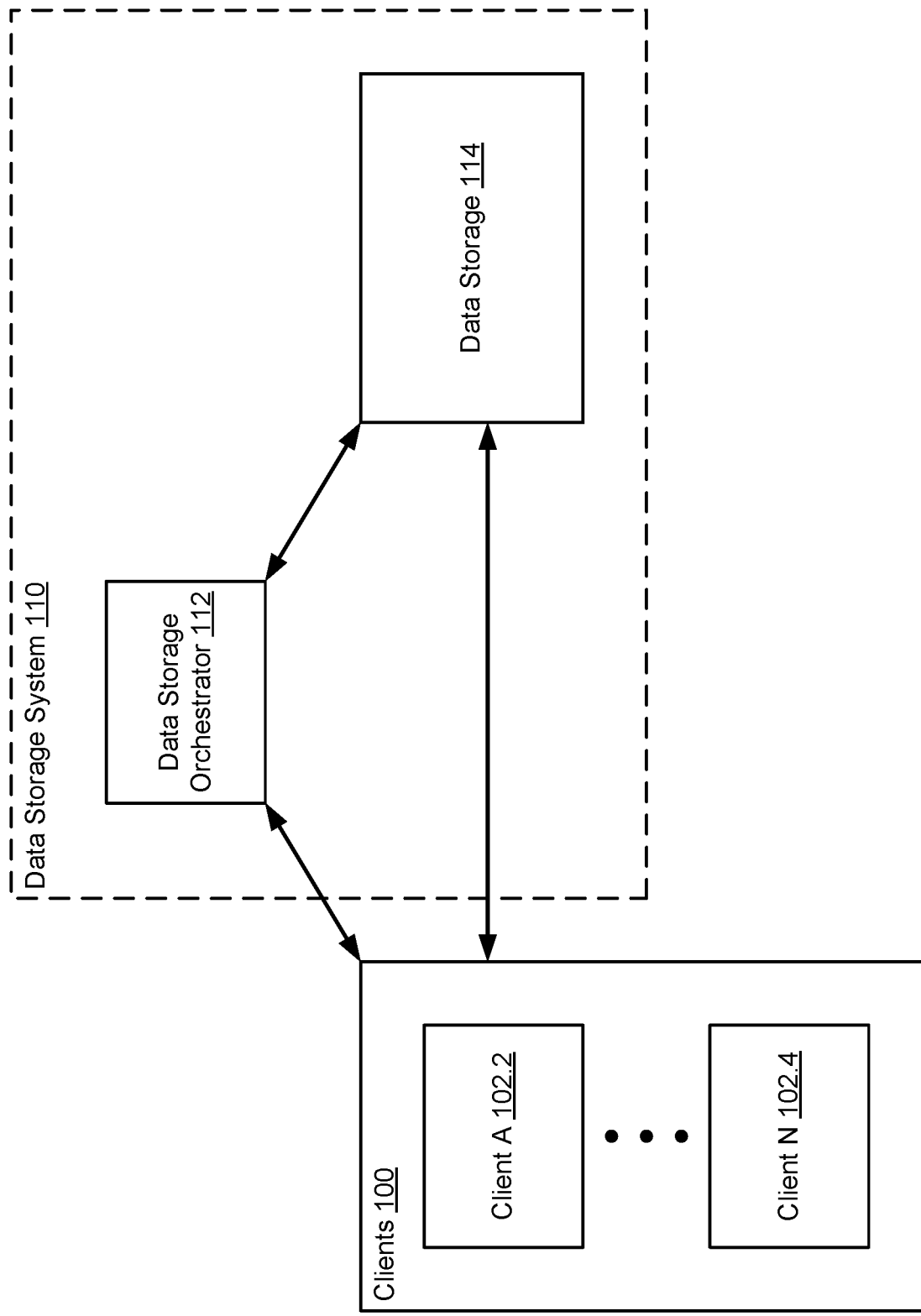

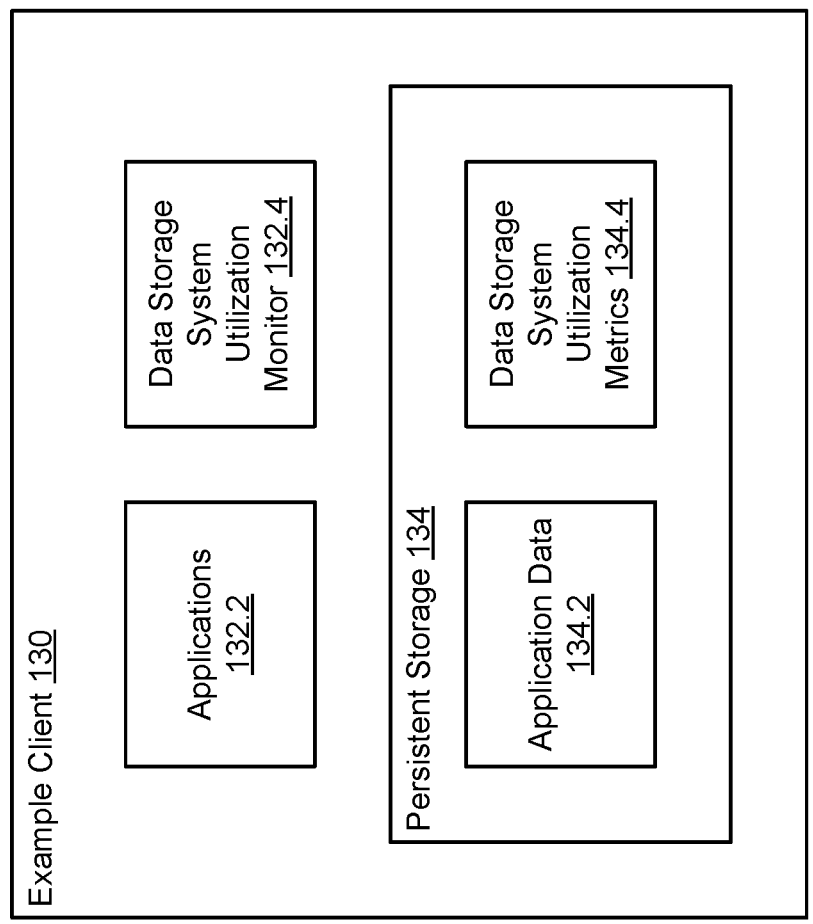
FIG. 1.2

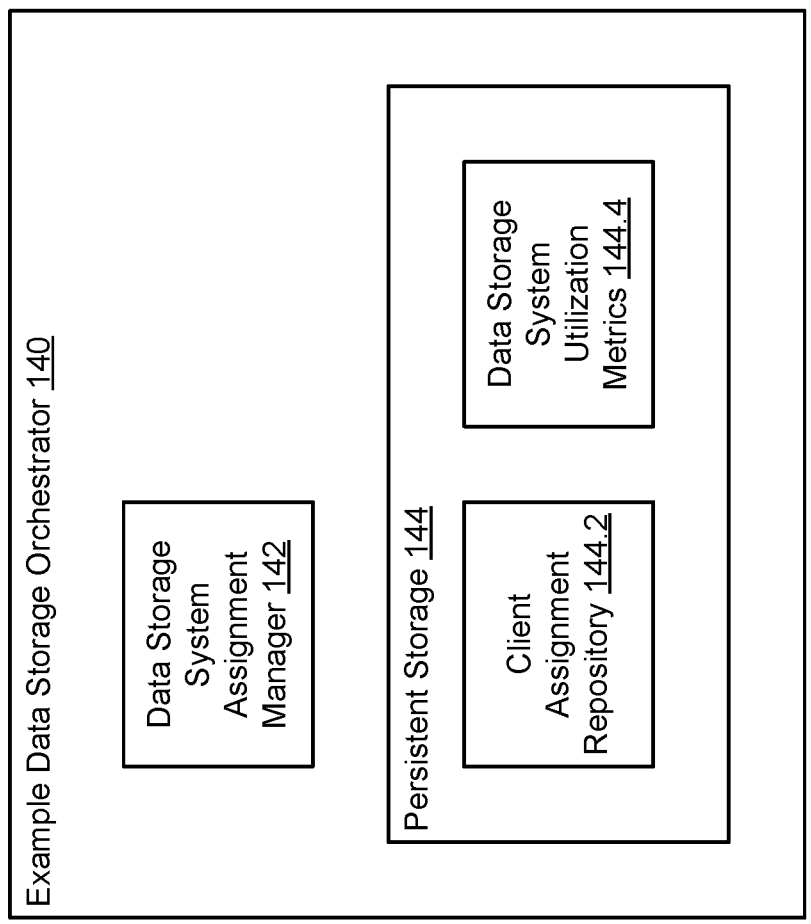
FIG. 1.3

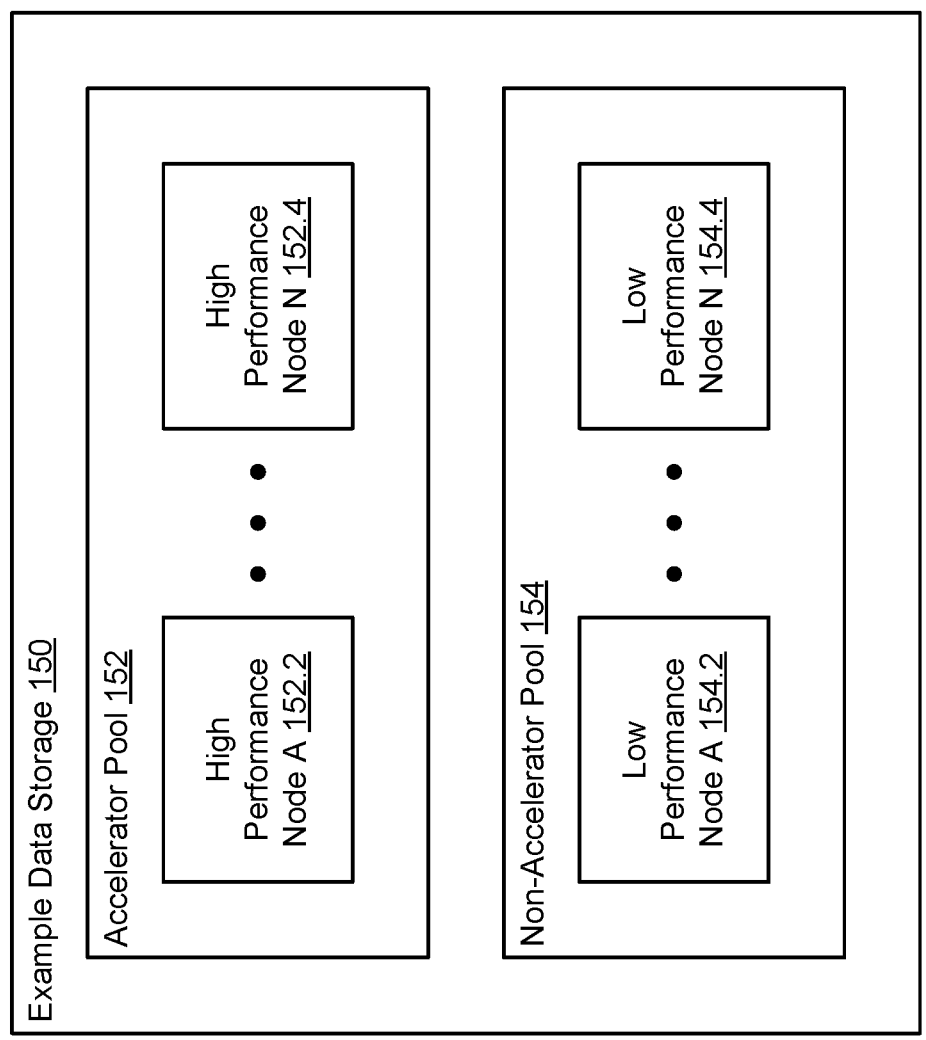
FIG. 1.4

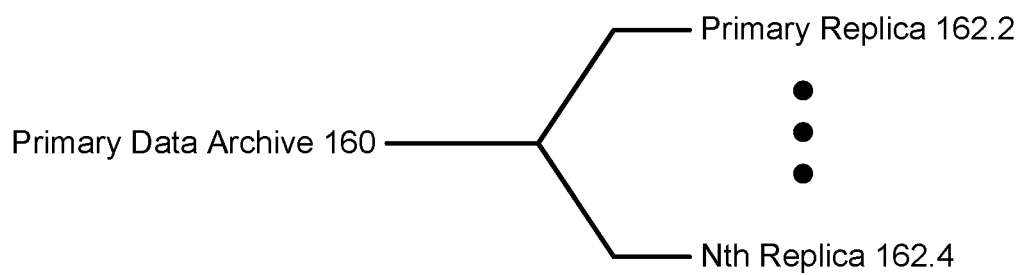
FIG. 1.5

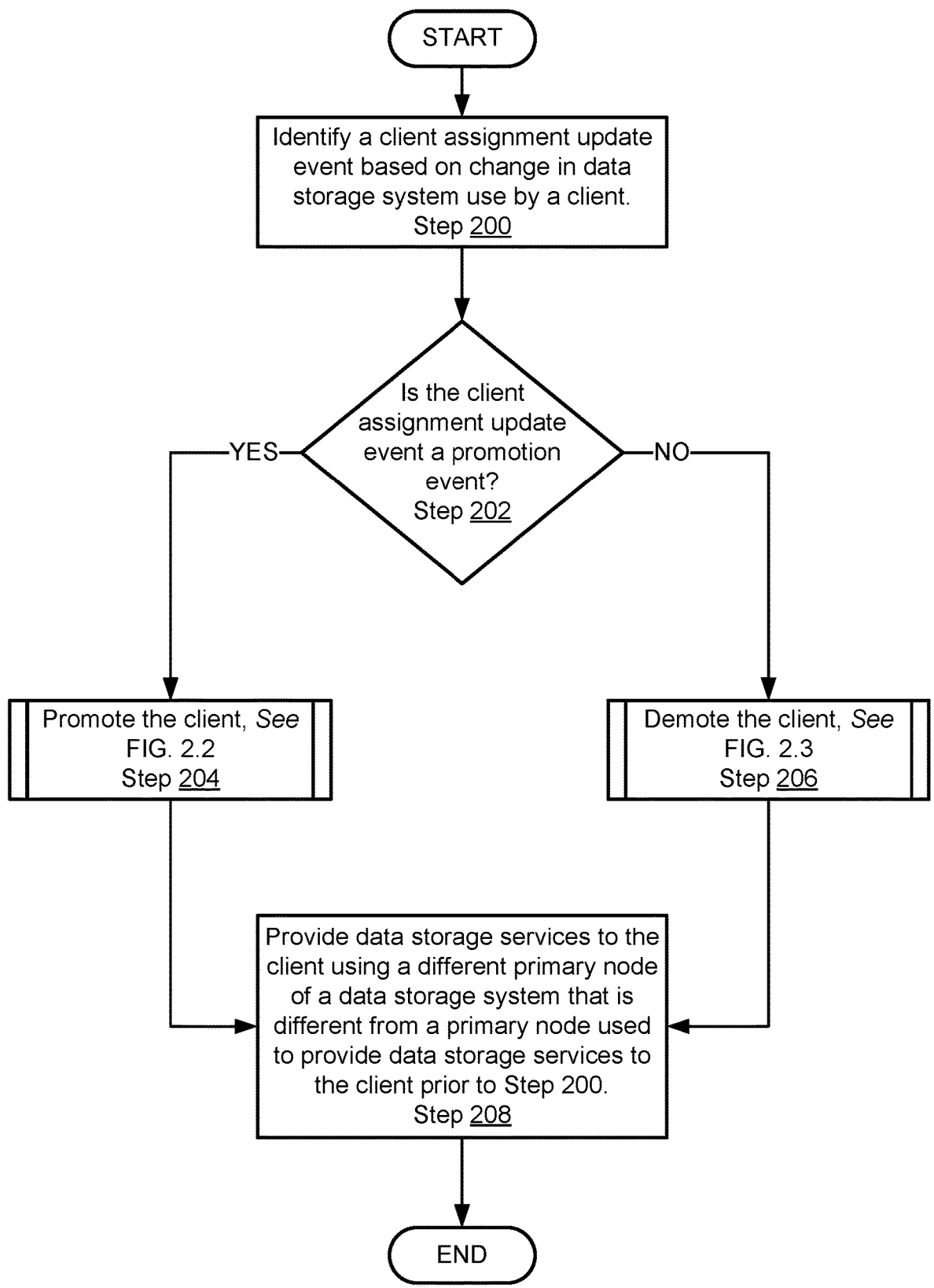
FIG. 2.1

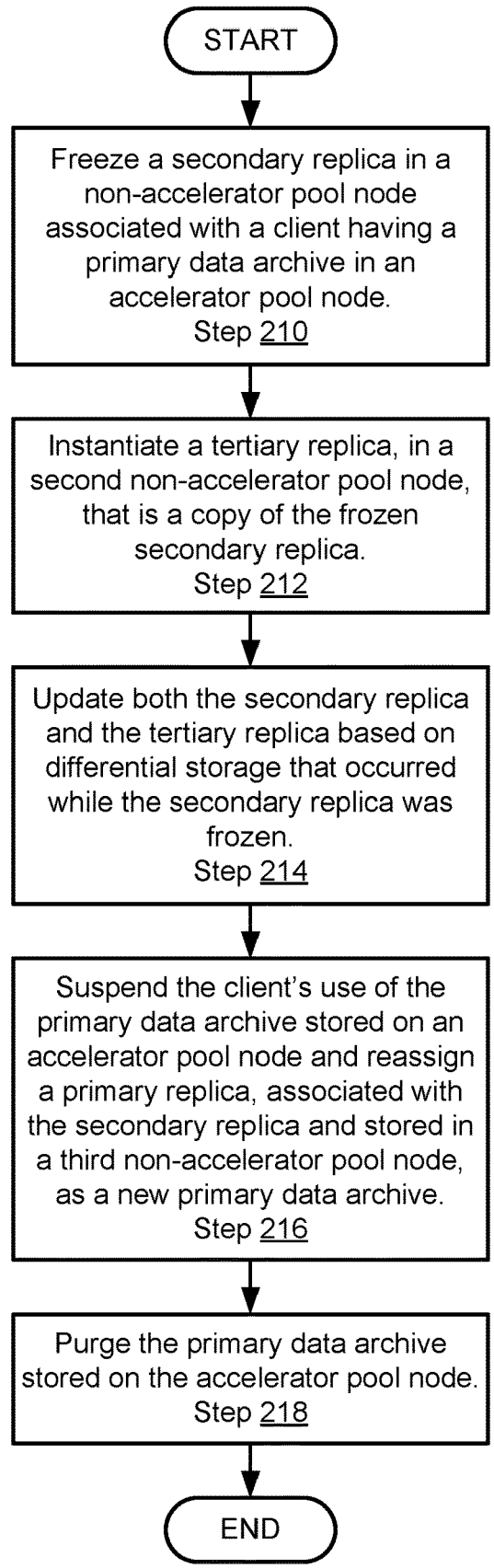
FIG. 2.2

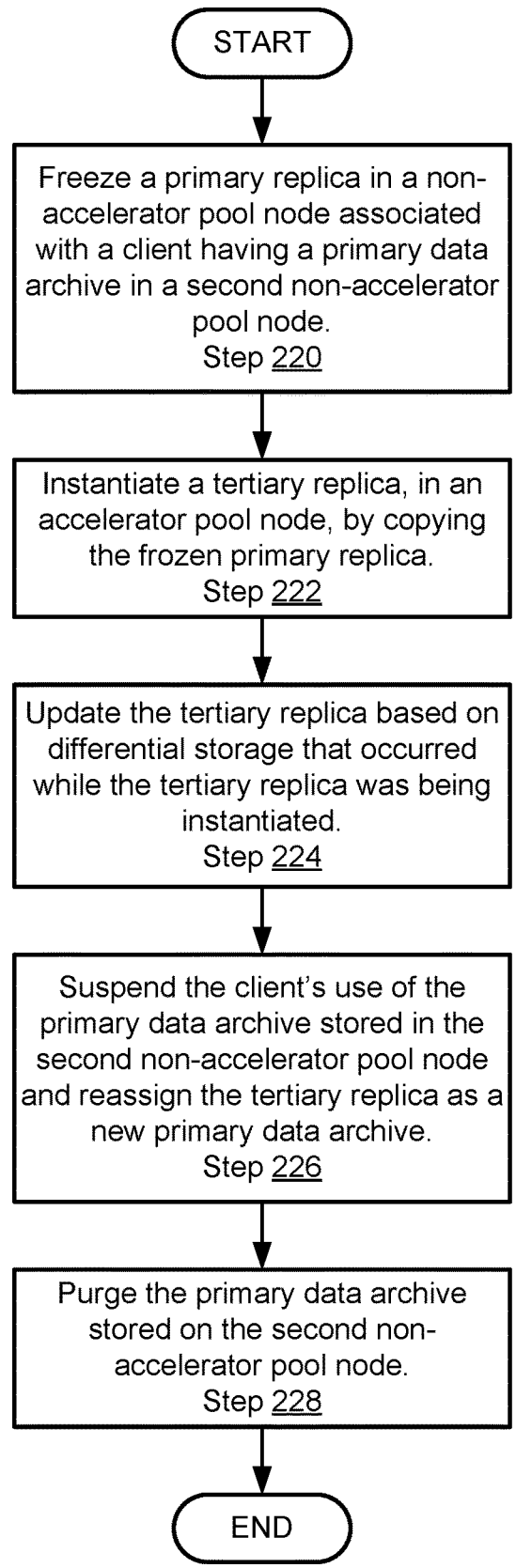
FIG. 2.3

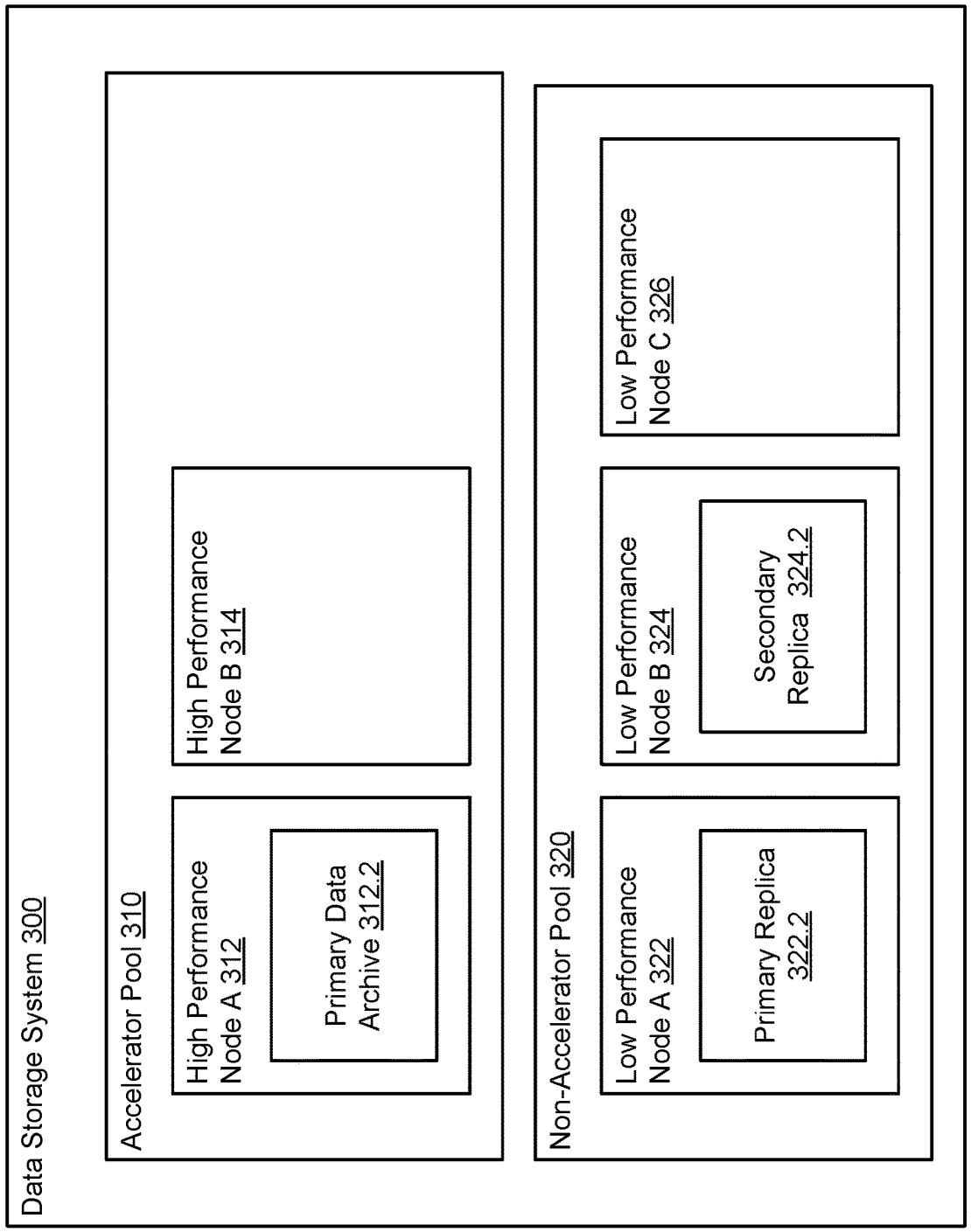
FIG. 3.1

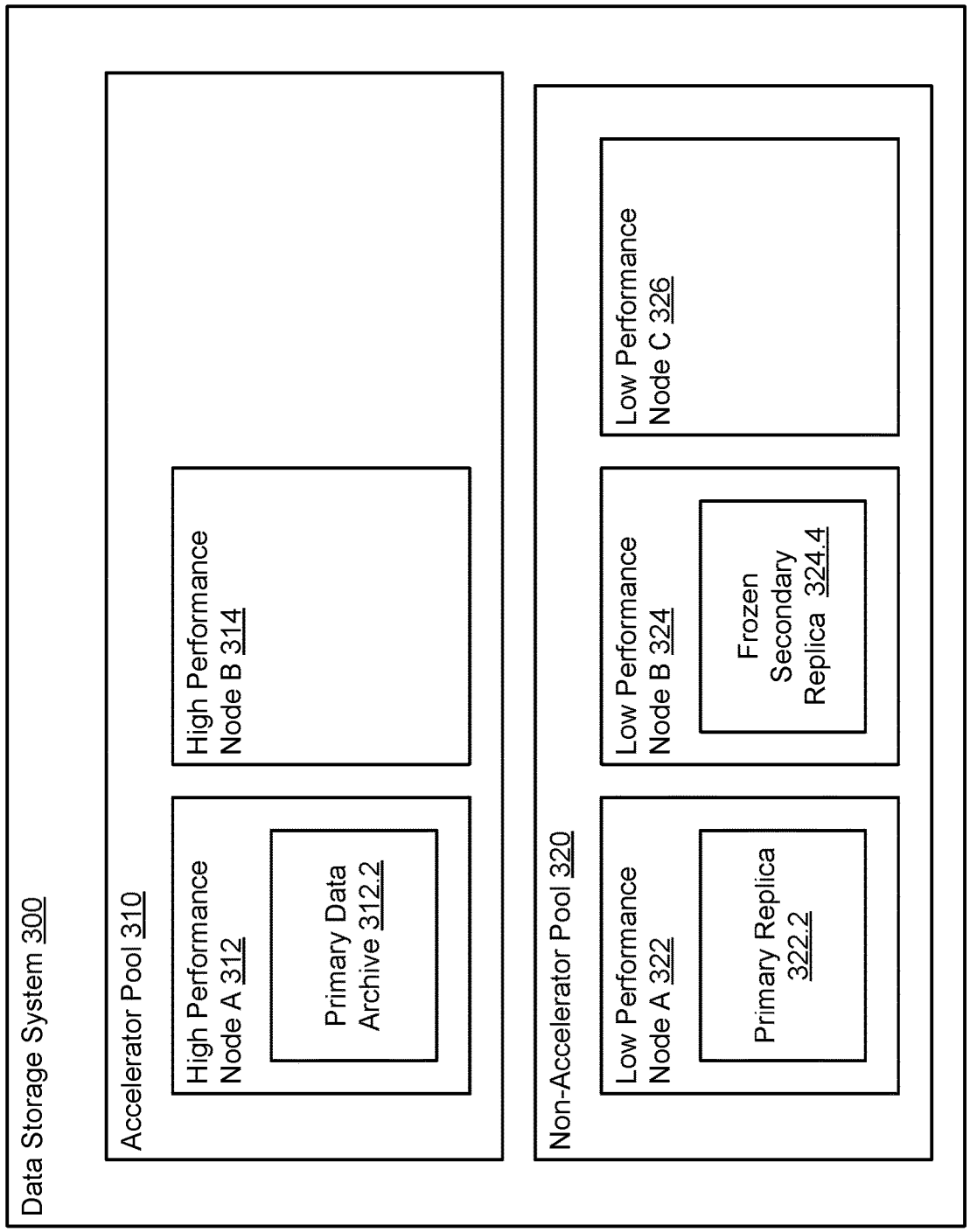
FIG. 3.2

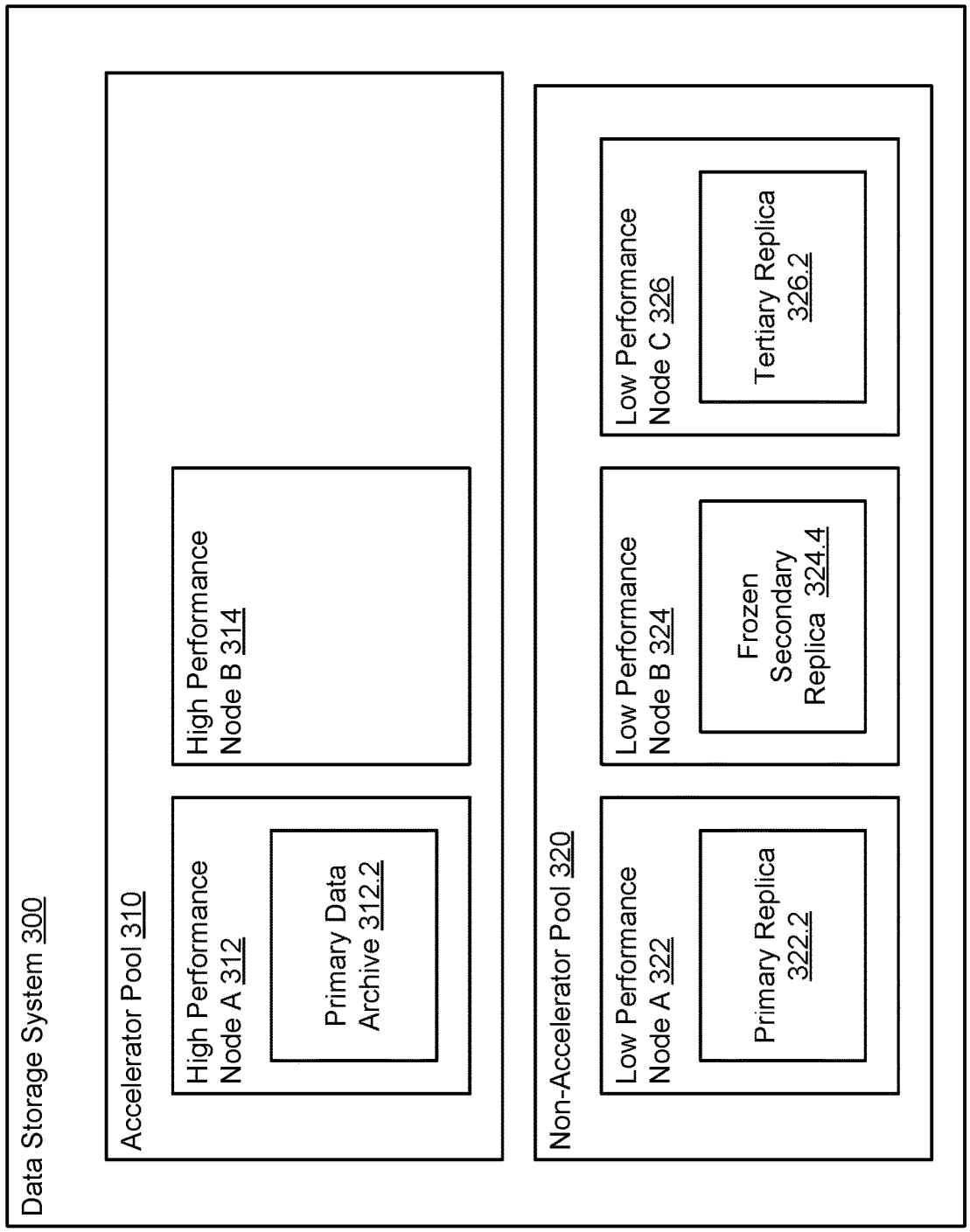
FIG. 3.3

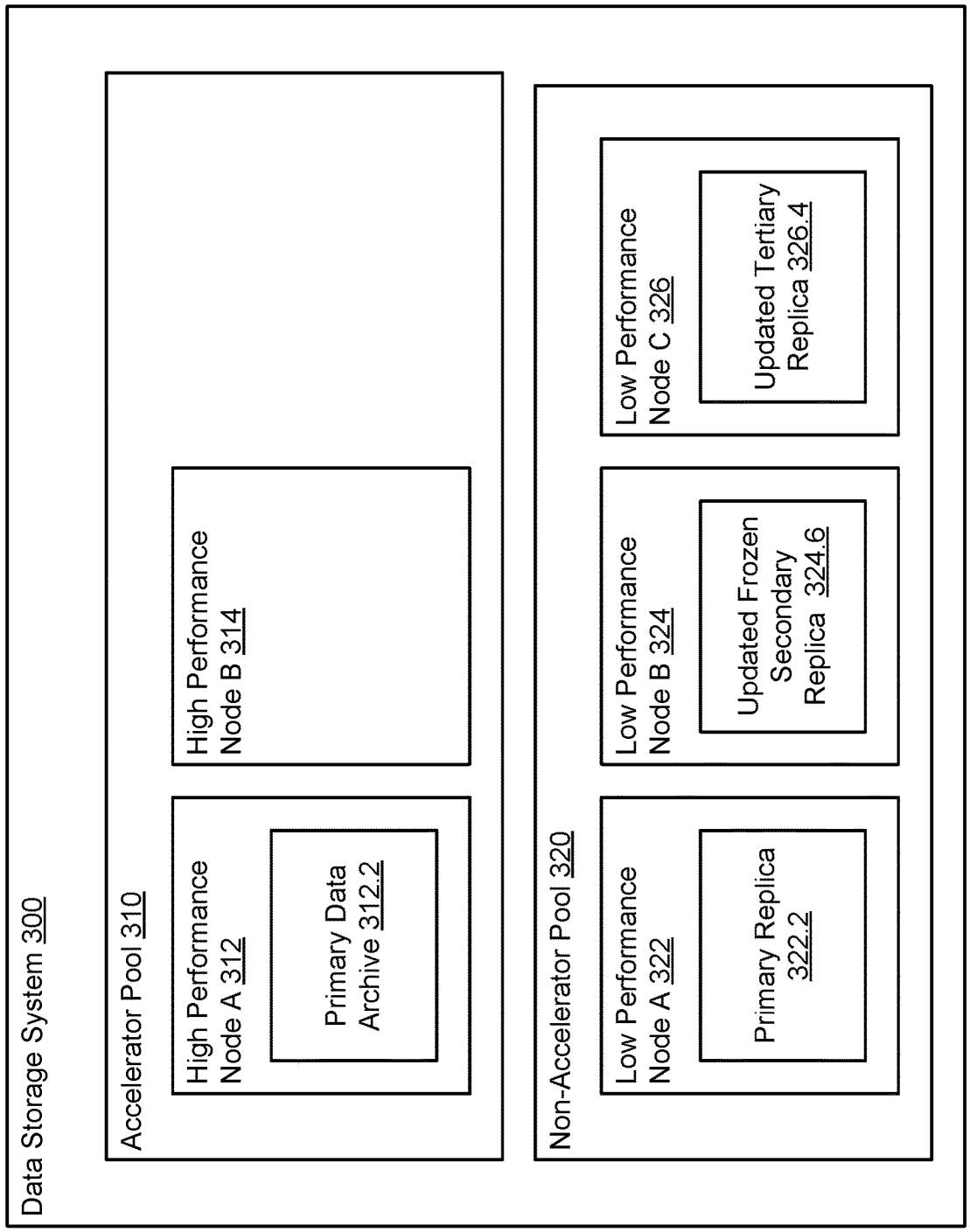
FIG. 3.4

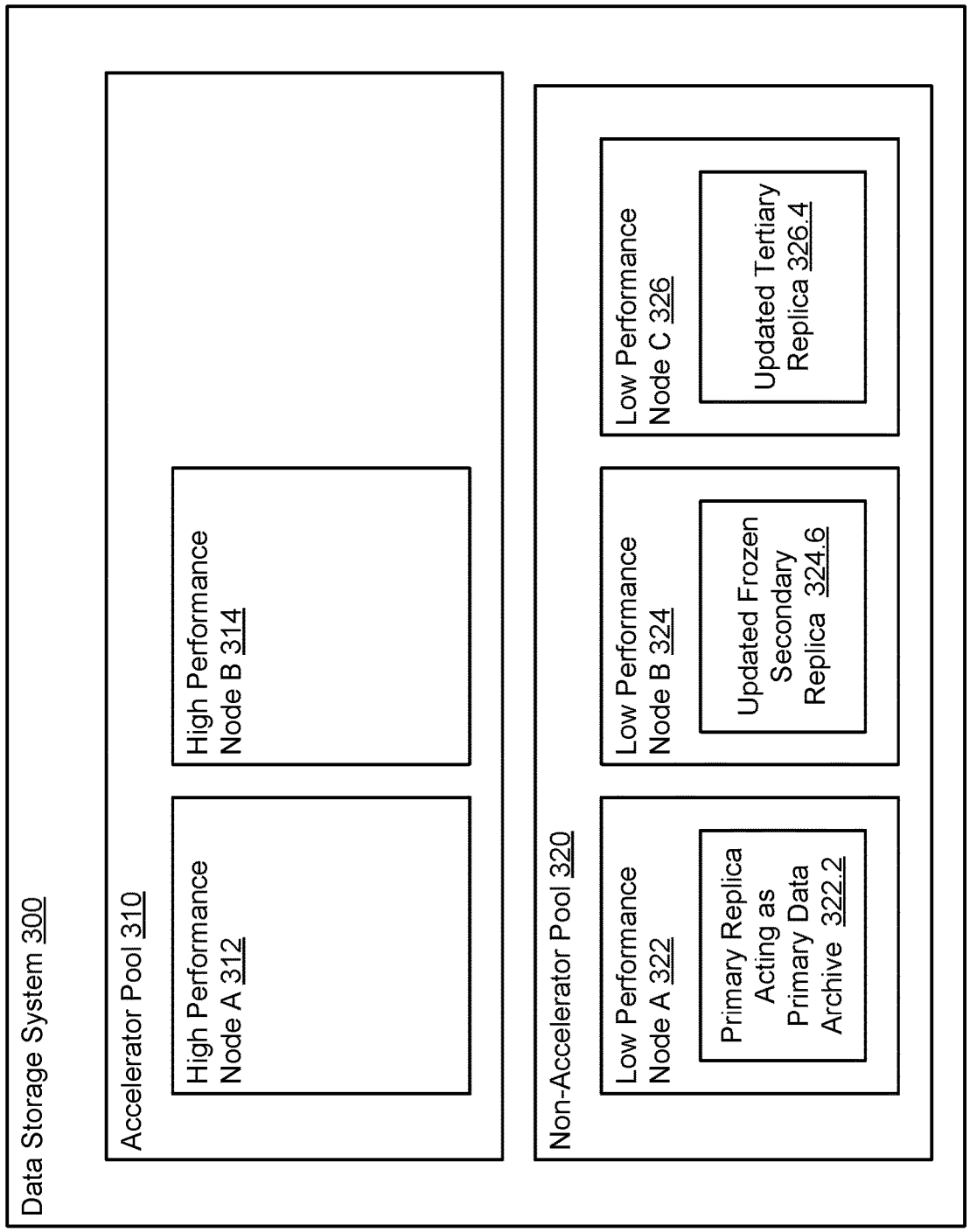
FIG. 3.5

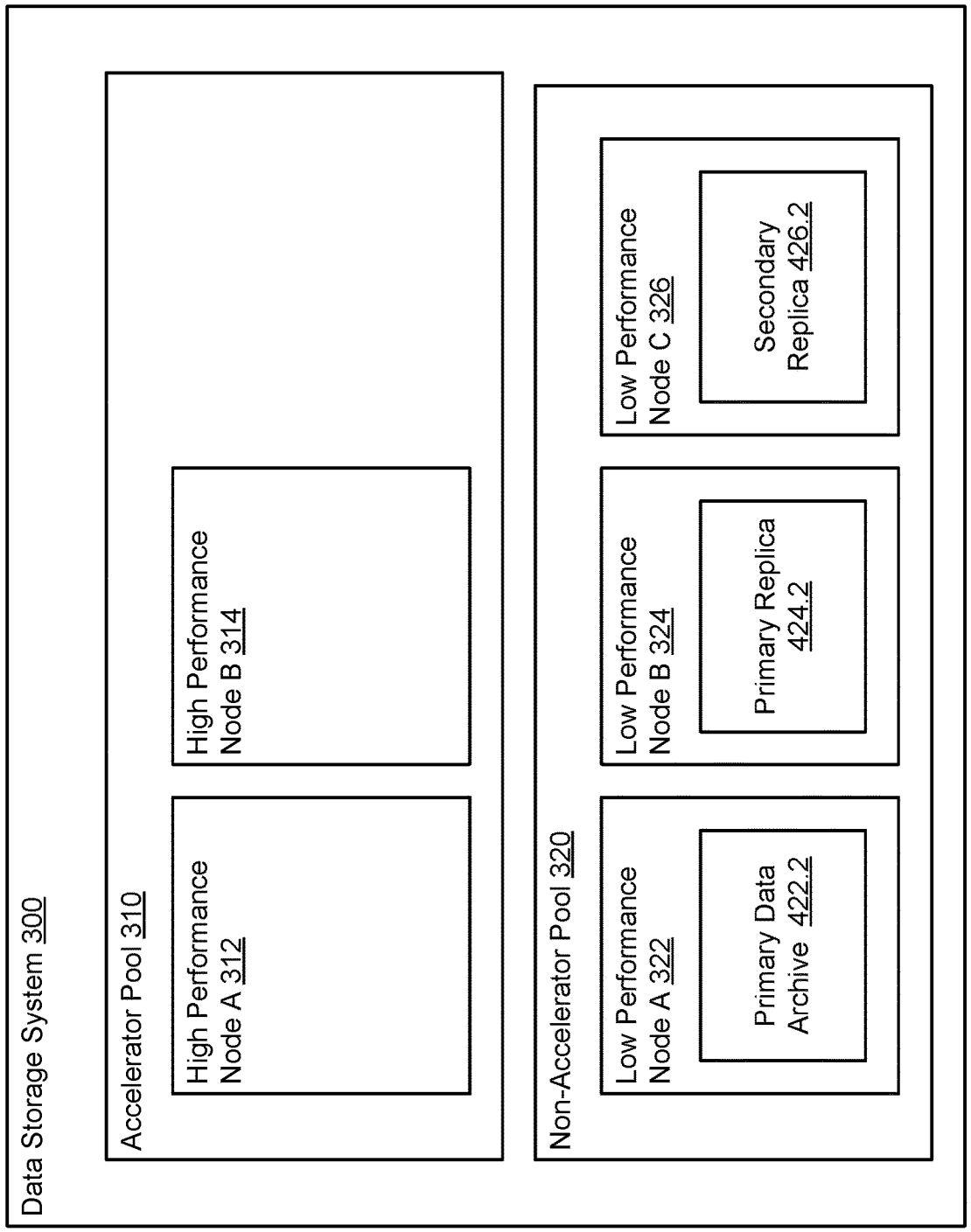
FIG. 4.1

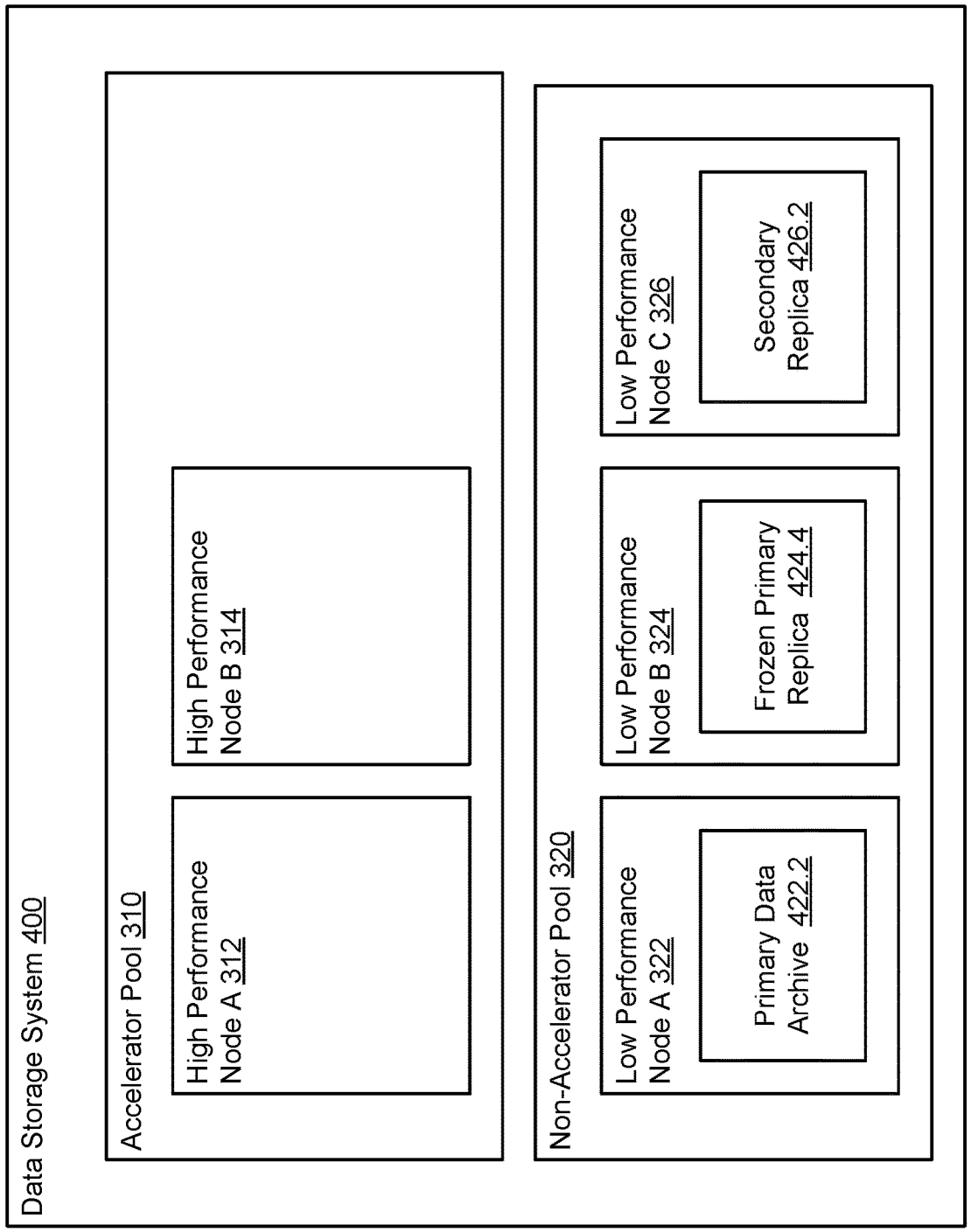
FIG. 4.2

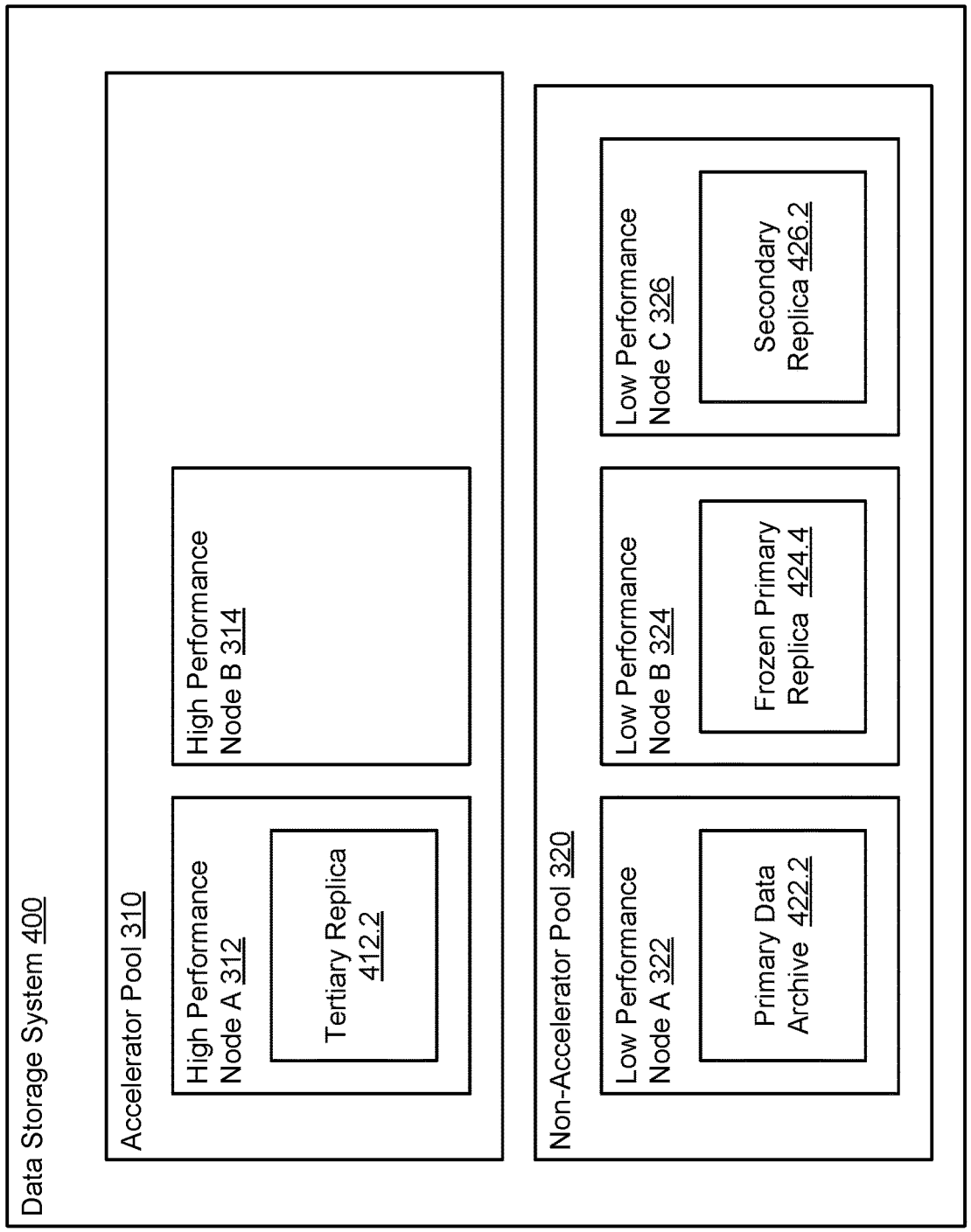
FIG. 4.3

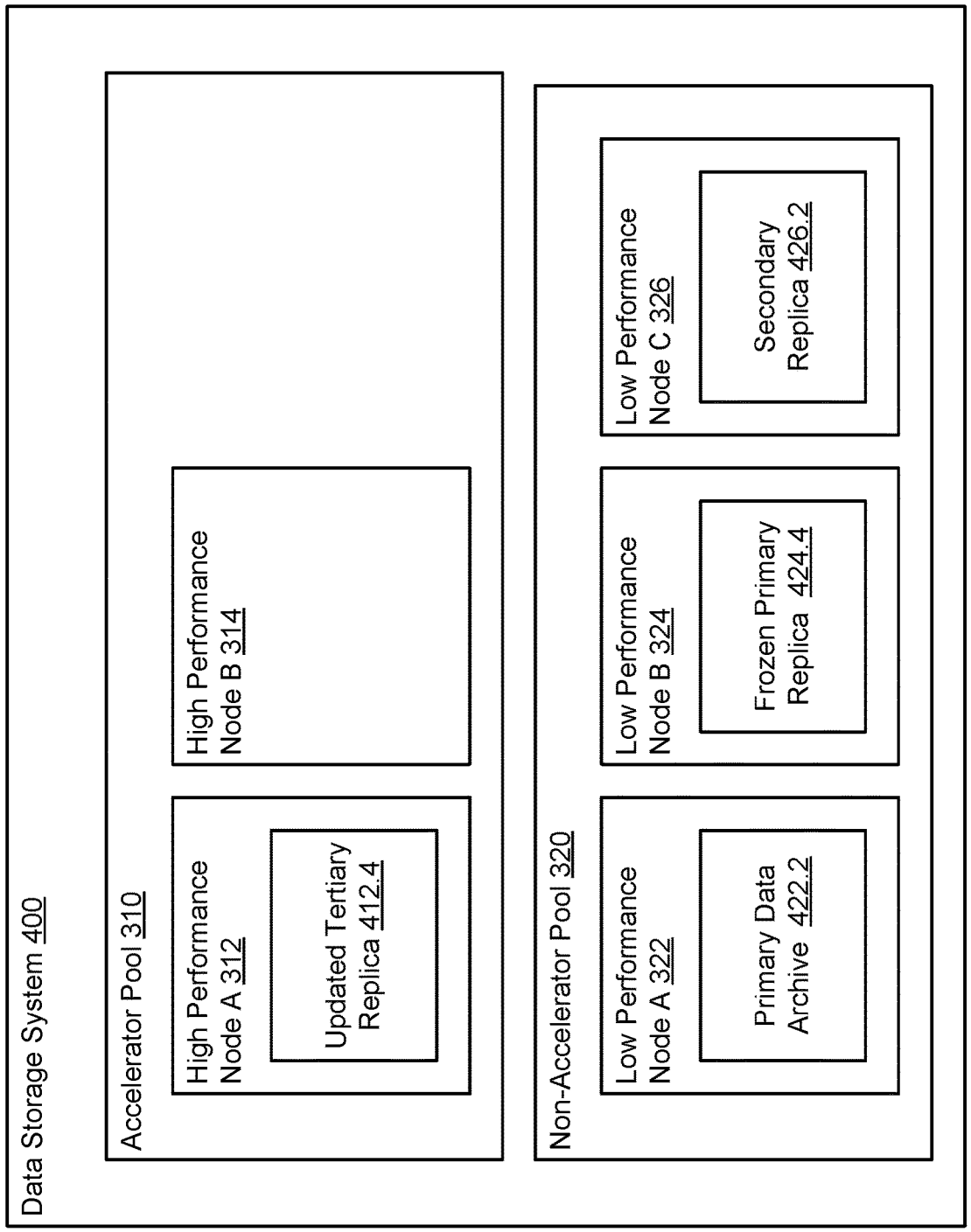
FIG. 4.4

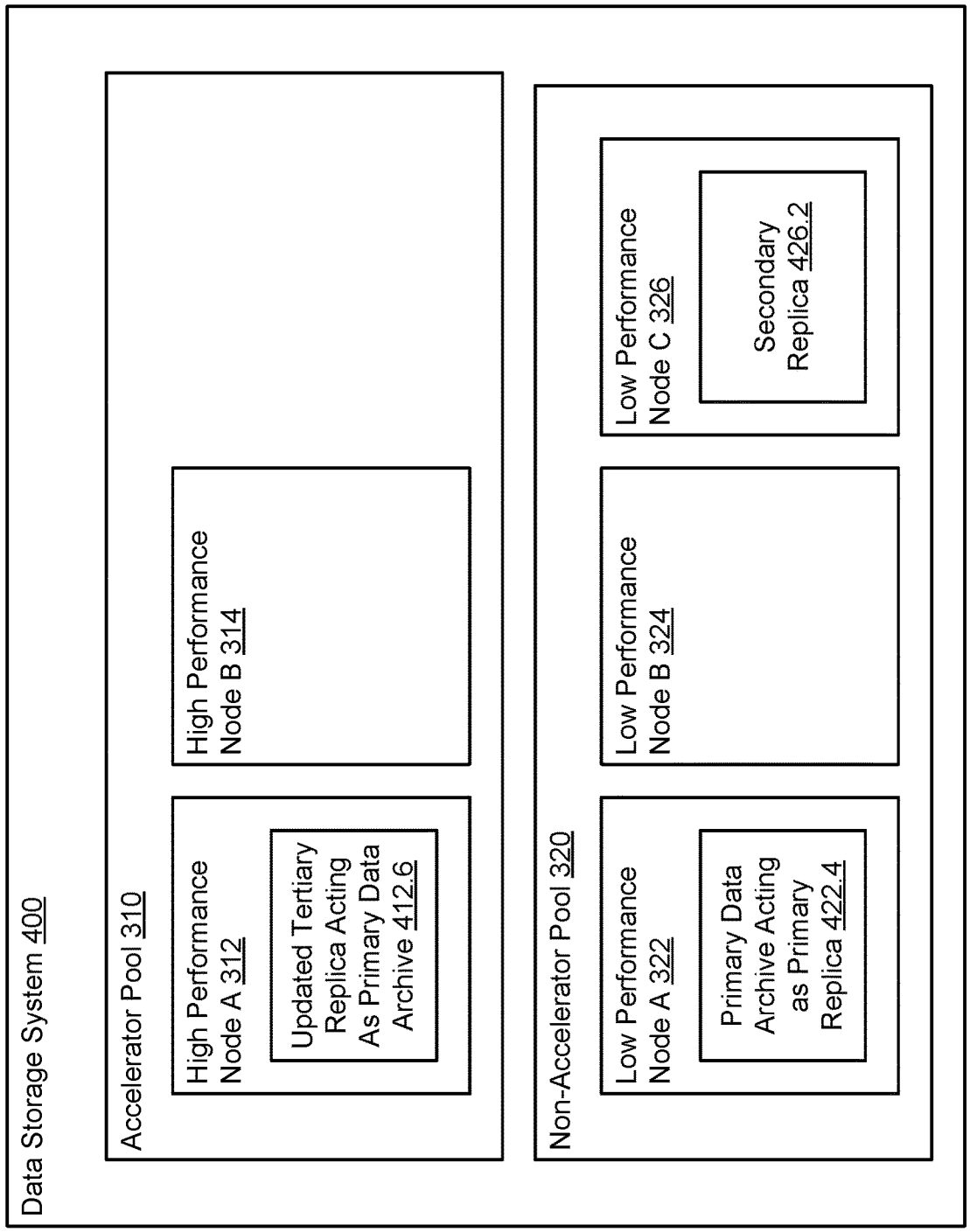
FIG. 4.5

US 10,740,023 B1

SYSTEM AND METHOD FOR DYNAMIC APPLICATION ACCESS-BASED MAPPING

BACKGROUND

Computing devices may generate data. For example, a computing device may host applications such as databases, email applications, instant messaging applications, word processing applications, etc. that generate data. Once generated, the data is saved in storage. The storage may be persistent storage of the computing device. Computing devices may include a finite quantity of persistent storage that is subject to failure.

SUMMARY

In one aspect, a data storage system for managing storage of data from clients in accordance with one or more embodiments of the invention includes a data storage and a data storage orchestrator. The data storage includes an accelerator pool and a non-accelerator pool. The data storage orchestrator identifies a client assignment update event based on a change in use of the data storage by a client of the clients, makes a determination that the client assignment update event is a promotion event, and in response to the determination: promotes the client to move a primary data storage of the client from the non-accelerator pool to the accelerator pool.

In one aspect, a method for managing storage of data from clients in accordance with one or more embodiments of the invention includes identifying, by a data orchestrator of a data storage system, a client assignment update event based on a change in use of a data storage of the data storage system by a client of the clients. The data storage includes an accelerator pool and a non-accelerator pool. The method further includes making a determination that the client assignment update event is a promotion event; and in response to the determination: promoting the client to move a primary data storage of the client from the non-accelerator pool to the accelerator pool.

In one aspect, a non-transitory computer readable medium in accordance with one or more embodiments of the invention includes computer readable program code, which when executed by a computer processor enables the computer processor to perform a method for managing storage of data from clients. The method includes identifying, by a data orchestrator of a data storage system, a client assignment update event based on a change in use of a data storage of the data storage system by a client of the clients. The data storage includes an accelerator pool and a non-accelerator pool. The method further includes making a determination that the client assignment update event is a promotion event; and in response to the determination: promoting the client to move a primary data storage of the client from the non-accelerator pool to the accelerator pool.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example client in accordance with one or more embodiments of the invention.

FIG. 1.3 shows a diagram of an example data storage orchestrator in accordance with one or more embodiments of the invention.

FIG. 1.4 shows a diagram of an example data storage in accordance with one or more embodiments of the invention.

FIG. 1.5 shows a relationship diagram of data storage relationships in accordance with one or more embodiments of the invention.

FIG. 2.1 shows a diagram of a flowchart of a method for storing data in accordance with one or more embodiments of the invention.

FIG. 2.2 shows a diagram of a flowchart of a method for promoting a client for data storage purposes in accordance with one or more embodiments of the invention.

FIG. 2.3 shows a diagram of a flowchart of a method for demoting a client for data storage purposes in accordance with one or more embodiments of the invention.

FIG. 3.1 shows a diagram of an example of a data storage at a first point in time.

FIG. 3.2 shows a diagram of the example of the data storage of FIG. 3.1 at a second point in time.

FIG. 3.3 shows a diagram of the example of the data storage of FIG. 3.1 at a third point in time.

FIG. 3.4 shows a diagram of the example of the data storage of FIG. 3.1 at a fourth point in time.

FIG. 3.5 shows a diagram of the example of the data storage of FIG. 3.1 at a fifth point in time.

FIG. 4.1 shows a diagram of a second example of a data storage at a first point in time.

FIG. 4.2 shows a diagram of the second example of the data storage of FIG. 4.1 at a second point in time.

FIG. 4.3 shows a diagram of the second example of the data storage of FIG. 4.1 at a third point in time.

FIG. 4.4 shows a diagram of the second example of the data storage of FIG. 4.1 at a fourth point in time.

FIG. 4.5 shows a diagram of the second example of the data storage of FIG. 4.1 at a fifth point in time.

DETAILED DESCRIPTION

Figure 5:
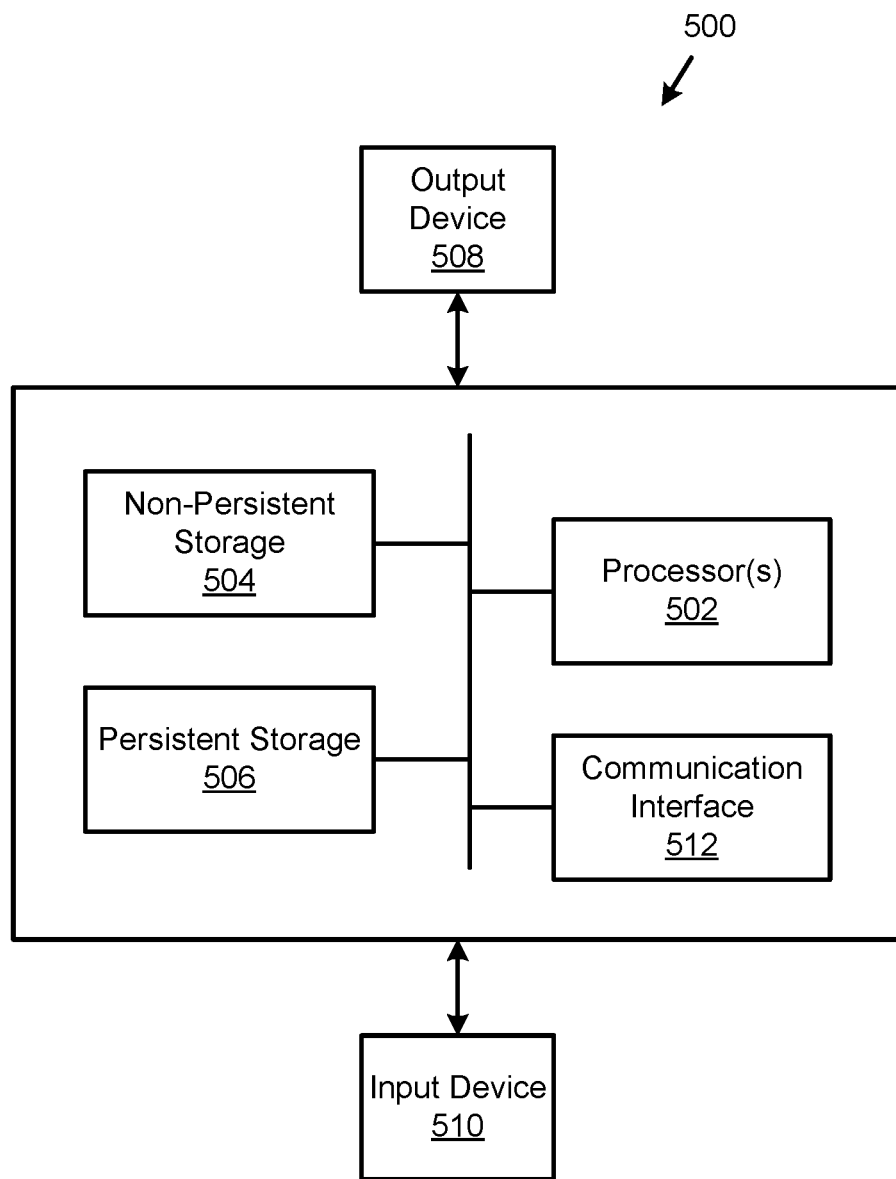
FIG. 5 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing client data. A system in accordance with embodiments of the invention may include a data storage system for storing client data. The data storage system may be a heterogeneous system that includes high performance and low performance resources. The data storage service provided to clients of the data storage system may vary depending on the type of resource, i.e., high or low performance, assigned to provide data storage service to each client.

In one or more embodiments of the invention, the data storage system assigns data storage resources to provide data storage services to the clients based on the data storage use rates of the clients. The assignments may be based on other information, alternatively or in addition to the data storage rates, regarding the client's use of the data storage services. By doing so, the data storage system may efficiently marshal its limited computing resources to meet the needs of each client.

In one or more embodiments of the invention, the data storage system may provide a method for seamlessly transitioning clients between different storage resources for data storage purposes. By doing so, clients may continue to receive data storage services even while the data storage system transitions the clients between different types of storage resources.

FIG. 1.1 shows a diagram of a system in accordance with one or more embodiments of the invention. The system may facilitate storage of client data from clients (100) in a data storage system (110). Storing the client data in the data storage system (110) may provide data redundancy and/or allow the clients (100) to offload data from local storage of the clients (100).

The data storage system (110) may provide data storage services to any number of clients (102.2, 102.4). To provide data storage services to the clients (100), the data storage system (110) may include a data storage orchestrator (112) and a data storage (114). The data storage orchestrator (112) may assign different components of the data storage (114) to provide different types of data storage services to the clients (100).

Any of the components of FIG. 1.1 may be operably connected by any combination of wired and/or wireless networks. For example, the data storage system (110) may be operably connected to the clients (100) and/or other entities (not shown) by a network (not shown). The other entities may be, for example, other computing devices. While for the sake of brevity the system of FIG. 1.1 has been illustrated as including a limited number of components, embodiments of the invention may include additional components than those shown in FIG. 1.1 without departing from the invention. Each component of the system of FIG. 1.1 is described below.

The clients (100) may utilize the data storage services of the data storage system (110). The clients (100) may send client data to the data storage system (110) for storage and retrieve data from the data storage system (110).

While utilizing the data storage services, the clients (100) may report characteristics of the client's use of the data storage services provided by the data storage system (110). For example, each of the clients (102.2, 102.4) may host an entity that provides information regarding the respective client's user of data storage services. The entity may be, for example, an agent or physical device. As will be discussed in greater detail below, the data storage orchestrator (112) may utilize such information when assigning components of the data storage (114) to provide data storage services to each of the clients (100).

In one or more embodiments of the invention, each of the clients (102.2, 102.4) is a physical device. The physical device may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). An example computing device is shown in FIG. 5. The persistent storage may store computer instructions, e.g., computer code, that when executed by the processor(s) of the computing device cause the computing device to perform the functions of the clients (102.2, 102.4) described in this application and/or all, or a portion, of the methods illustrated in FIGS. 2.1-2.3. The clients (102.2, 102.4) may be other types of computing devices without departing from the invention.

While the clients (102.2, 102.4) have been described as being physical devices, the clients (102.2, 102.4) may be implemented as logical devices, e.g., virtual devices, which utilize computing resources of other physical computing devices without departing from the invention. For example, the clients (102.2, 102.4) may be implemented as logical devices that utilize computing resources of computing devices or other entities operably connected to the node. For additional details regarding clients, refer to FIG. 1.2.

The data storage orchestrator (112) may provide assignment services. Providing assignment services may cause portions of the data storage (114) to provide data storage services to different clients (e.g., 102.2, 102.4). Providing assignment services may include: (i) monitoring client use of data storage services and (ii) assigning components of the data storage (114) to providing storage services to the client based on the monitored client's use of the data storage services.

In one or more embodiments of the invention, the data storage orchestrator (112) is a physical device. The physical device may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). An example computing device is shown in FIG. 5. The persistent storage may store computer instructions, e.g., computer code, that when executed by the processor(s) of the computing device cause the computing device to perform the functions of the deployment orchestrator (110) described in this application and/or all, or a portion, of the methods illustrated in FIGS. 2.1-2.3. The data storage orchestrator (112) may be other types of computing devices without departing from the invention.

While the data storage orchestrator (112) has been described as being a physical device, the data storage orchestrator (112) may be implemented as a logical device, e.g., virtual device, which utilize computing resources of other physical computing devices without departing from the invention. For example, the data storage orchestrator (112) may be implemented as logical device that utilizes computing resources of computing devices or other entities operably connected to the data storage orchestrator (112). For additional details regarding the data storage orchestrator (112), refer to FIG. 1.3.

The data storage (114) may provide data storage services to the clients (100). The data storage services may include storing data from the clients and providing stored data to the clients. By doing so, the clients (100) may more efficiently utilize their local storage resources and/or backup client data so that failure of a client's storage does not cause data loss.

In one or more embodiments of the invention, the data storage (114) redundantly stores multiple copies of data from the clients. For example, the data storage (114) may store 1, 2, 3, 4, 5, etc. copies of the data. Each of the stored copies may be stored in similar and/or different fault domains. A fault domain may be a portion of the data storage (114) that is not impacted by the failure of other fault domain for providing data storage services. Thus, if one fault domain of the data storage (114) storing a copy of client data fails, the data storage (114) may provide a second copy of the data stored in a second fault domain of the data storage to service a request from a client for the data.

In one or more embodiments of the invention, the data storage (114) includes heterogeneous storage resources that have different storage performance characteristics. For example, the data storage (114) may include some high-performance storage resources and some low performance storage resources. Thus, the storage performance for providing data storage services to the clients (100) may vary depending on which components of the data storage (114) are assigned to provide data storage services to the clients (100).

In one or more embodiments of the invention, the data storage (114) is a physical device. The physical device may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). An example computing device is shown in FIG. 5. The persistent storage may store computer instructions, e.g., computer code, that when executed by the processor(s) of the computing device cause the computing device to perform the functions of the data storage (114) described in this application and/or all, or a portion, of the methods illustrated in FIGS. 2.1-2.3. The data storage (114) may be other types of computing devices without departing from the invention.

While the data storage (114) has been described as being a physical device, the data storage (114) may be implemented as a logical device, e.g., virtual device, which utilize computing resources of other physical computing devices without departing from the invention. For example, the data storage (114) may be implemented as logical device that utilizes computing resources of computing devices or other entities operably connected to the data storage (114). For additional details regarding the data storage (114), refer to FIG. 1.4.

While the system of FIG. 1.1 has been illustrated as including a limited number of components, a system in accordance with one or more embodiments of the invention may include additional, fewer, and/or different components without departing from the invention. Additionally, while FIG. 1.1 as illustrated as only showing connections between some components of the system, a system in accordance with one or more embodiments of the invention may include any number of connections between any of the components illustrated in FIG. 1.1 and/or other components not illustrated in FIG. 1.1 without departing from the invention.

As noted above, the clients (100) may utilize the data storage services provided by the data storage system (100).

To further clarify the clients (100), a diagram of an example client (100) in accordance with one or more embodiments of the invention is shown in FIG. 1.2.

The example client (100) may include applications (132.2), a data storage system utilization monitor (132.4), and persistent storage (134). Each component of the example client (100) is discussed below.

The applications (132.2) may be any type of program executing using computing resources of the example client (130). For example, the applications (132.2) may be electronic mail applications, word processing applications, database applications, electronic messaging applications, and/or any other type of computer implemented service. When executing, the applications (132.2) may generate application data (134.2) that is relevant to a user of the example client (130). The example client (130) may send a copy of, all or, and/or a portion of the application data (134.2) to a data storage system for storage when utilizing data storage services offered by the client. To facilitate such storage, the example client (130) may host an interface application (not shown) to efficiently store in and retrieve data from the data storage system.

The data storage system utilization monitor (132.4) may provide data storage system use monitoring services. To provide data storage system use monitoring services, the data storage system utilization monitor (132.4) may monitor: (i) the storage of application data (134.2) and/or other data to the data storage system and (i) retrieval of data from the data storage system by the example client (130). The data storage system utilization monitor (132.4) may generate statistics based on monitoring and store the generated statistics as data storage system utilization metrics (134.4). The data storage system utilization monitor (132.4) may store the results of the monitoring as part of the data storage system utilization metrics (134.4).

In one or more embodiments of the invention, the data storage system utilization metrics (134.4) includes a data storage rate, a data retrieval rate, and latency information between the example client and the data storage system. The data storage system utilization metrics (134.4) may include such information over time and at any level of granularity, e.g., a data storage rate calculated and stored every 30 seconds, every 30 minutes, every hour, every 12 hours, every day, etc.

In one or more embodiments of the invention, the data storage system utilization monitor (134.2) provides the data storage system utilization metrics (134.4) to the data storage system. For example, the data storage system utilization monitor (134.2) may provide the data storage system utilization metrics (134.4) to a data storage orchestrator of the data storage system. The data storage system utilization monitor (134.2) may provide the data storage system utilization metrics (134.4) based on a schedule and/or in response to requests from the data storage system. The schedule may be, for example, every hour, every 15 minutes, daily, etc. The schedule may be other types of periodic or non-periodic scheduling without departing from the invention.

In one or more embodiments of the invention, the data storage system utilization monitor (134.2) is a physical device. The physical device may include circuitry. The physical device may include a field programmable gate array, application specific integrated circuit, digital signal processor, microcontroller, and/or an embedded processor. The physical device may include persistent storage that stores computing instructions which when executed by the physical device cause the physical device to perform the functions of the data storage system utilization monitor (134.2) described throughout this application and/or all or a portion of the methods illustrated in FIGS. 2.1-2.3.

In one or more embodiments of the invention, the data storage system utilization monitor (134.2) is implemented as a logical entity. For example, the data storage system utilization monitor (134.2) may be an application executing using hardware resources, e.g., processor cycles, memory capacity, storage capacity, communication bandwidth, etc., of the example client (100).

The persistent storage (134) may be a physical device for storing digital data. The persistent storage (134) may include any number of physical devices for storing digital data. The physical devices may be, for example, hard disk drives, solid state drives, tape drives, and any other type of physical device for persistent storage of data.

In one or more embodiments of the invention, the persistent storage (134) is a virtualized resource. For example, the persistent storage (134) may be a virtual drive. The virtual drive may use computing resources of any number of physical computing devices without departing from the invention.

While the example client (130) has been illustrated as including a limited number of component, the example client (130) may include additional, fewer, and/or different components without departing from the invention.

As noted above, the orchestrator (112, FIG. 1.1) may provide assignment services. To further clarify the orchestrator (112, FIG. 1.1), a diagram of an example orchestrator (140) in accordance with one or more embodiments of the invention is shown in FIG. 1.3.

The example data storage orchestrator (140) may include a data storage system assignment manager (142.2) and persistent storage (144). Each component of the example data storage orchestrator (140) is discussed below.

The data storage system assignment manager (142) may provide assignment services. By providing assignment services, components of a data storage system may provide data storage services to clients. For example, the data storage system assignment manager (142) may assign different components of the data storage system to provide data storage services to different clients. As noted above, different components of the data storage system may have different quantities/types of computing resources and, consequently, provide different qualities of storage services.

In one or more embodiments of the invention, the data storage system assignment manager (142) provides assignment services by (i) obtaining data storage system utilization metrics (134.2, FIG. 1.2) from a client and storing a local copy of the data storage system utilization metrics (144.4), (ii) comparing the data storage system utilization metrics (144.4) to thresholds associated with different components of the data storage system, and (iii) assigning the client to some of the different components of the data storage system for purposes of data storage services based on the comparison.

In one or more embodiments of the invention, the thresholds associated with the different components of the data storage system each specify different utilization rates of data storage services. For example, a threshold may specify a data storage rate of 10 Megabytes per second. If the data storage rate by the client is less than the threshold, a first group of low performance components of the data storage may be assigned to provide services to the client. The first group of low performance components may serve as a primary data archive storage and also serve as any number of replicas storages. A replica may be a copy of a primary data archive. The replicas may be stored in separate fault domains for data retrieval reliability purposes. In this scenario, the data storage services provided to the client may be low performance.

In contrast, if the data storage rate by the client is greater than the threshold, a second group of high performance components of the data storage and the first group of low performance components of the data storage may be assigned to provide data storage services to the clients. The second group of components may serve as a primary data archive storage and the second group of components may serve as replicas storages. In this second scenario, the data storage services provided to the client may be high performance because the client may only interact with the second group of high performance components of the data storage.

When components of the data storage are assigned to the client, the assignment may be recorded in a client assignment repository (144.2). After a client is initially assigned, the assignment may be reviewed. The review may be conducted periodically or in response to the occurrence of a specific event. For example, an agent hosted by a client may notify the example data storage orchestrator (140) if the data storage system utilization metrics (134.2, FIG. 1.2) of the client change significantly.

If the data storage system utilization metrics (144.4) have changed so that a change in the comparison to the threshold occurs, components of the data storage system may be reassigned to provide data storage services to the client based on the new threshold comparison. By doing so, assignment of component of the data storage system may be continuously updated so that components of the data storage having commensurate performance are assigned to meet the data storage requirements of the clients.

In one or more embodiments of the invention, the data storage system assignment manager (142) is a physical device. The physical device may include circuitry. The physical device may include a field programmable gate array, application specific integrated circuit, digital signal processor, microcontroller, and/or an embedded processor. The physical device may include persistent storage that stores computing instructions which when executed by the physical device cause the physical device to perform the functions of the data storage system assignment manager (142) described throughout this application and/or all or a portion of the methods illustrated in FIGS. 2.1-2.3.

In one or more embodiments of the invention, the data storage system assignment manager (142) is implemented as a logical entity. For example, the data storage system assignment manager (142) may be an application executing using hardware resources, e.g., processor cycles, memory capacity, storage capacity, communication bandwidth, etc., of the example data storage orchestrator (140).

The persistent storage (144) may be a physical device for storing digital data. The persistent storage (144) may include any number of physical devices for storing digital data. The physical devices may be, for example, hard disk drives, solid state drives, tape drives, and any other type of physical device for persistent storage of data.

In one or more embodiments of the invention, the persistent storage (144) is a virtualized resource. For example, the persistent storage (144) may be a virtual drive. The virtual drive may use computing resources of any number of physical computing devices without departing from the invention.

While the example data storage orchestrator (140) has been illustrated as including a limited number of component, the example data storage orchestrator (140) may include additional, fewer, and/or different components without departing from the invention.

As discussed above, the data storage (114, FIG. 1.1) may include different components having different quantities of computing resources. To further clarify the data storage (114, FIG. 1.1), a diagram of an example data storage (150) in accordance with one or more embodiments of the invention is shown in FIG. 1.4.

The example data storage (150) may be a distributed system. The distributed system may include any number of nodes. Each of the nodes may cooperate to provide data storage services to the data storage system.

When providing data storage services to the clients, the nodes of the data storage system may act as either (i) a primary data archive or (ii) a replica. For additional details regarding primary data archives and replicas, refer to FIG. 1.5.

Different nodes of the distributed system may include different quantities and/or types of computing resources, e.g., processors providing processing resources, memory providing memory resources, storages providing storage resources, communicators providing communications resources. Thus, the distributed system may include a heterogeneous population of nodes.

The heterogeneous population of nodes may be logically divided into an accelerator pool (152) including nodes that have more computing resources, e.g., high performance nodes (152.2, 152.4) than other nodes and a non-accelerator pool (154) including nodes that have fewer computing resources, e.g., low performance nodes (154.2, 154.4) than the nodes in the accelerator pool (152). For example, nodes of the accelerator pool (152) may enterprise class solid state storage resources that provide very high storage bandwidth, low latency, and high input-outputs per second (IOPS). In contrast, the nodes of the non-accelerator pool (152) may include hard disk drives that provide lower storage performance. While illustrated in FIG. 1.4 as being divided into two groups, the nodes may be divided into any number of groupings based on the relative performance level of each node without departing from the invention.

When a data storage system orchestrator assigns components of the example data storage (150) to provide storage services to a client, the assignment may be on a node-basis. That is, a first node of one of the pools may be assigned as a primary data archive and other nodes that are assigned to service the clients may be assigned as replicas. Client data may be initially stored in the primary data archive and copies of the client data may be stored in the replicas following storage in the primary data archive. Thus, depending on the storage needs of each client, it may be advantageous to assign different types of nodes to act as either a primary data archive or a replica. If only low performance storage is necessary, only nodes of the non-accelerator pool (154) may be assigned. In contrast, if high performance storage is necessary, nodes of the accelerator pool (152) may be assigned to act as a primary data archive. Non-accelerator pool (154) nodes may be assigned to act as replicas of the primary data archive. By doing so, the storage performance of the data storage (150), from the perspective of the client, may be greatly improved while not requiring all components of the example data storage (150) used to provide data storage services to be high performance nodes.

In one or more embodiments of the invention, different nodes of the example data storage (150) are in different fault domains. Thus, a failure of any node may not render the other nodes inoperable for purposes of providing data storage services to the clients.

In one or more embodiments of the invention, each nodes of the example data storage (150) is a physical device. The physical device may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). An example computing device is shown in FIG. 5. The persistent storage may store computer instructions, e.g., computer code, that when executed by the processor(s) of the computing device cause the computing device to perform the functions of the respective node described in this application and/or all, or a portion, of the methods illustrated in FIGS. 2.1-2.3. Each of the nodes (e.g., 152.2, 152.4, 154.2, 154.4) may be other types of computing devices without departing from the invention.

While the example data storage (150) has been illustrated as including a limited number of components, the example data storage (150) may include additional, fewer, and/or different components without departing from the invention.

To further clarify aspects of embodiments of the invention, a relationship diagram illustrating relationships in accordance with one or more embodiments of the invention is illustrated in FIG. 1.5. In FIG. 1.5, a relationship between a primary data archive (160) and replicas is illustrated. As discussed above, when data is stored in a data storage, multiple copies of the data may be stored. When data is first stored, it may be stored in a primary data archive (160). After data is initially stored in the primary data archive (160), copies of the data may be stored in replicas. A replica may be another data structure that mirrors the primary data archive (160). An acknowledgement may be sent when the initial copy of the client data is stored in the primary data archive (160), when some copies are stored in the replicas, or when all of the copies of the client data are stored (i.e., primary and all replicas).

As seen in FIG. 1.5, there may be any number of replicas (162.2, 162.4) that correspond to a primary data archive (160). For example, there may be a primary replica (162.2), secondary replica (not shown), and a tertiary replica (not shown) when a minimum of four copies of client data are to be stored in the data storage (a copy in the primary data archive (160), and a copy in each of the three replicas). Each of the primary data archive and the replicas may be stored in separate fault domains.

As will be discussed in greater detail below, replicas may be used when transitioning a client from receiving data storage services from a first group of components of the data storage to a second group of components of the data storage. Such transitions may occur when a client's data storage system use rate changes.

As discussed above, a data storage system may provide data storage services to clients. FIGS. 2.1-2.3 show methods in accordance with one or more embodiments of the invention that may be performed by components of the system of FIG. 1.1. While illustrated as a series of steps, any of the steps shown in FIGS. 2.1-2.3 may be omitted, performed in a different order, and/or performed in a parallel or partially overlapping manner. Further, additional steps, other than those shown in FIGS. 2.1-2.3 may be performed as part of the methods discussed below without departing from the invention.

FIG. 2.1 shows a flowchart of a method in accordance with one or more embodiments of the invention. The method depicted in FIG. 2.1 may be used to provide data storage services to clients in accordance with one or more embodiments of the invention. The method shown in FIG. 2.1 may be performed by, for example, a data storage system (e.g., 110, FIG. 1.1). Other components of the system illustrated in FIG. 1.1 may perform the method of FIG. 2.1 without departing from the invention.

In step 200, a client assignment update event is identified based on a change in use of a data storage system by a client.

In one or more embodiments of the invention, the change in use of the data storage system by the client is identified based on monitoring of the clients use of the data storage system. For example, the client may report its use of the data storage system to the data storage system. In another example, the data storage system may actively monitor the client's use of the data storage system.

In one or more embodiments of the invention, the client's use of the data storage system is monitored over a predetermined period of time. For example, the predetermined period of time may be 24 hours. The monitoring during the predetermined period of time may be compared to monitoring during other predetermined periods of time to identify the change.

To further clarify, consider a scenario in which a client hosts a database that typically stores 100 Gigabytes of data in the data storage system on a daily basis. If the client only stores 20 Gigabytes of data in the data storage system during a particular day, a comparison between 20 Gigabytes and the 100 Gigabytes average reveals a change.

While described above as being a comparison on a daily basis, other statistical characterizations of the client's use of the data storage system by the client may be used to identify a change in the client's user of the data storage system. For example, a mean and standard deviation over a rolling seven day period may be calculated. If the client's user of the data storage system during a particular day is outside one standard deviation of the mean of the use, the data storage system may identify that a change has occurred.

The identification of Step 200 may be performed by a data storage orchestrator of the data storage system.

In step 202, a determination is made regarding whether the client assignment update event is a promotion event.

In one or more embodiments of the invention, a client assignment update event is an event that, upon its occurrence, causes the data storage system to transition different components of a data storage to provide data storage services to the client.

In one or more embodiments of the invention, a promotion event is an event that causes high-performance nodes to be transitioned to provide data storage services to the client and causes low performance nodes to be transitioned away from providing data storage services to the client.

In one or more embodiments of the invention, the determination is made based on at least one threshold associated with a pool of the data storage. The threshold may specify a use rate of data storage services by the client. For example, the threshold may specify a data storage rate in the data storage system by the client. The threshold may be the maximum data storage rate of a node of a non-accelerator pool of the data storage. The threshold may be other values without departing from the invention. For example, the threshold may be 80% of the maximum data storage rate of a node of the non-accelerator pool of the data storage.

If the data storage rate that caused the client assignment update event to be identified exceeds the threshold, the client assignment update event is identified as a promotion event. If the data storage rate that caused the client assignment update event to be identified does not exceed the threshold, the client assignment event is not identified as a promotion event.

If the client assignment event is a promotion event, the method may proceed to step 204, if the client assignment event is not a promotion event, the method may proceed to step 206.

In step 204, client is promoted.

In one or more embodiments of the invention, promoting the client causes a primary data archive for the client to be transitioned to a high performance node of an accelerator pool.

In one or more embodiments of the invention, the client is promoted via the method illustrated in FIG. 2.2. The client may be promoted via other methods without departing from the invention.

In step 208, data storage services are provided to the client using a different primary node of a data storage system that is different from a primary node used to provide data storage services to the client prior to step 200.

In one or more embodiments of the invention, the data storage services are provided to the client by storing client data in a primary data archive in the different primary node.

In one or more embodiments of the invention, a primary node of the data storage is a node that hosts a primary data archive associated with a client. The client is associated with a single primary node. As described above, client data is first stored in a primary data archive prior to storing copies of the client data in replicas hosted by other nodes of the data storage.

The method may end following step 208.

Returning to step 202, the method may proceed to step 206 following step 202 if the client assignment update event is not a promotion event.

In step 206, the client is demoted.

In one or more embodiments of the invention, demoting the client causes a primary data archive for the client to be transitioned to a low performance node of a non-accelerator pool.

In one or more embodiments of the invention, the client is demoted via the method illustrated in FIG. 2.3. The client may be demoted via other methods without departing from the invention.

FIG. 2.2 shows a flowchart of a method in accordance with one or more embodiments of the invention. The method depicted in FIG. 2.2 may be used to promote a client in accordance with one or more embodiments of the invention. The method shown in FIG. 2.2 may be performed by, for example, a data storage system (e.g., 110, FIG. 1.1). Other components of the system illustrated in FIG. 1.1 may perform the method of FIG. 2.2 without departing from the invention.

In step 210, a second replica in a non-accelerator pool node associated with a client having a primary data archive in an accelerator pool node is frozen.

In one or more embodiments of the invention, freezing the second replica causes the second replica to no longer mirror a primary data archive associated with the client. Freezing the second replica may prevent changes to the primary data archive from being mirrored in the second replica after the freeze.

In step 212, a tertiary replica is instantiated in a second non-accelerator pool node.

In one or more embodiments of the invention, the tertiary replica is instantiated by making a copy of the frozen secondary replica in the second non-accelerator pool node. Thus, in this instance, the tertiary replica does not mirror the primary data archive. Rather, the instantiated tertiary replica mirrors the state of the primary data archive prior to freezing of the secondary replica. The second non-accelerator pool node is any node of the non-accelerator pool that does not already store any of the client data. The second non-accelerator pool node may be in a separate fault domain from the other replicas and/or the primary data archive.

In step 214, both of the secondary replica and the tertiary replica are updated based on differential storage that occurred while the secondary replica was frozen.

In one or more embodiments of the invention, the differential storage is client data stored in the primary data archive that was stored while the secondary replica was frozen.

In one or more embodiments of the invention, updating the secondary replica and the tertiary replica causes both replicas to mirror the primary data archive.

In step 216, the client's use of the primary data archive is suspended and a primary replica, associated with the secondary replica and stored in a third non-accelerator pool node, is reassigned as the new primary data archive.

In one or more embodiments of the invention, reassigning the primary replica as the new primary data archive causes client data to be stored in the primary replica first and causes the primary replica to act as the primary data archive for the client.

In one or more embodiments of the invention, suspending the client's use of the primary data archive is performed by sending instructions to a data storage to divert storage of client data to the primary replica from the primary data archive.

In step 218, the primary data archive stored in the accelerator pool node is purged.

The primary data archive may be purged by deleting the primary data archive.

The method may end following Step 218.

Via the method illustrated in FIG. 2.2, a client that stores data in a low performance node of a data storage may be transitioned to first storing data in a high performance node with copies of the client data being stored in replicas hosted by low performance nodes of the data storage. The above method may provide a seamless transition that may be transparent to the client. Accordingly, data storage services provided by the data storage system may not be interrupted via the method illustrated in FIG. 2.2.

FIG. 2.3 shows a flowchart of a method in accordance with one or more embodiments of the invention. The method depicted in FIG. 2.3 may be used to demote a client in accordance with one or more embodiments of the invention. The method shown in FIG. 2.3 may be performed by, for example, a data storage system (e.g., 110, FIG. 1.1). Other components of the system illustrated in FIG. 1.1 may perform the method of FIG. 2.3 without departing from the invention.

In step 220, a primary replica in a non-accelerator pool node associated with a client having a primary data archive in a second non-accelerator pool node is frozen.

The primary replica may be frozen as discussed with respect to step 210 of FIG. 2.2.

In step 222, a tertiary replica is instantiated in accelerator pool.

In one or more embodiments of the invention, the tertiary replica is instantiated by making a copy of the frozen primary replica in a high performance node of the accelerator pool.

In step 224, the tertiary replica is updated based on differential storage that occurred while the tertiary replica was being instantiated.

In one or more embodiments of the invention, the differential storage is client data that was stored to a primary data archive associated with the primary replica while the primary replica was chosen. The tertiary replica may be updated by applying the changes implicated by the differential storage. After updating the tertiary replica, the tertiary replica may mirror the primary data archive.

In step 226, the client's use of the primary data archive stored in a second non-accelerator pool node is suspended and the tertiary replica is reassigned as a new primary data archive.

In one or more embodiments of the invention, reassigning the tertiary replica as a new primary data archive causes client data associated with the primary data archive to be first stored in the tertiary replica and the tertiary replica acts as the primary data archive for the client.

In one or more embodiments of the invention, the client's use of the primary data archive is suspended by redirecting writes to the primary data archive to the tertiary replica.

In step 228, the primary data archive stored on the second non-accelerator pool node is purged.

In one or more embodiments of the invention, the primary data archive is purged by deleting the primary data archive.

The method may end following step 228.

Via the method illustrated in FIG. 2.3, a client that stores data in a high performance node of a data storage may be transitioned to first storing data in a low performance node with copies of the client data being stored in replicas hosted by other low performance nodes of the data storage. The above method may provide a seamless transition that may be transparent to the client. Accordingly, data storage services provided by the data storage system may not be interrupted via the method illustrated in FIG. 2.3.

To further clarify aspects of embodiments of the invention, two non-limiting examples are provided in FIGS. 3.1-3.5 and FIGS. 4.1-4.5, respectively. In FIGS. 3.1-4.5, a system similar to the system of FIG. 1.1 is providing data storage services to clients. For the sake of brevity, only a limited number of components of the system of FIG. 1.1 is shown in FIGS. 3.1-4.5.

First Example

Consider a scenario as illustrated in FIG. 3.1 in which a client is storing data in a data storage system (300). At the point in time illustrated in FIG. 3.1, client data is initially stored in a primary data archive (312.2) hosted by high performance node A (312) of an accelerator pool (310). The accelerator pool (310) may also include a second high performance, high performance node B (314). After client data is initially stored in the primary data archive (312.2), copies of the data stored in a primary replica (322.2) and a secondary replica (324.2). The primary replica (322.2) is hosted by a low performance node A (322) of a non-accelerator pool (320). The secondary replica (324.2) is hosted by low performance node B (322) of the non-accelerator pool (320). The non-accelerator pool (320) also includes low performance Node C (326).

Over time, a rate of storing client data in the data storage system (300) decreases below threshold used to determine whether nodes of the accelerator pool (310) are to be used for initial storage of the client data. In response to the client data storage rate fallen below the threshold, a data storage orchestrator (not shown) initiates a transition from storing the client data in the accelerator pool (310) to storing the client data in the non-accelerator pool (320).

To start the transition, the secondary replica (324.2) is frozen to obtain a frozen secondary replica (324.4) as shown in FIG. 3.2. While the secondary replica is frozen, client data is still stored in the primary data archive (312.2) and the primary replica (322.2) continues to store copies of the client data after initial storage in the primary data archive (312.2).

After obtaining the frozen secondary replica (324.4), a tertiary replica (326.2) is instantiated in low performance node C (326) as shown in FIG. 3.3. When instantiated, the tertiary replica (326.2) is a copy of the frozen secondary replica (324.4). Due to computing resource limitations for instantiating the tertiary replica (326.2), client data continues to be stored in the primary data archive (312.2) and copies of the client data or stored in the primary replica (322.2), which causes the frozen secondary replica (324.4) and the tertiary replica (326.2) to have different data from that of the primary data archive and primary replica.

After instantiating the tertiary replica (326.2), the frozen secondary replica (324.4) and the tertiary replica (326.4) are updated to have similar data to the primary data archive and the primary replica. Consequently, an updated frozen secondary replica (324.6) and it updated tertiary replica 326.4 are obtained as illustrated in FIG. 3.4.

After updating the secondary and tertiary replicas, the primary data archive (312.2) is deleted and the primary replica is modified to act as the primary data archive (322.2) as shown in FIG. 3.5.

During the process illustrated in FIGS. 3.1-3.5, client data was continuously stored by the data storage system (300) while the internal storage topology was modified so that client data was only stored in the non-accelerator pool (320).

End of First Example

Second Example

Consider a scenario as illustrated in FIG. 4.1 in which a data storage system (300) identical to that shown in FIGS. 3.1-3.5 but is storing client data differently (e.g., in different locations) than the data storage system of FIGS. 3.1-3.5. At the point in time illustrated in FIG. 4.1, client data is initially stored in a primary data archive (422.2) hosted by low performance node A (322) of a non-accelerator pool (320). A primary replica (424.2) and a secondary replica (426.2) are hosted by low performance node B (324) and low performance node C (326), respectively. In this storage topology, low performance nodes are performing the storage of client data. Consequently, the client is provided a low quality of storage service. In contrast, the storage system of FIG. 3.1 was initially storing client data in the accelerator pool (310). Consequently, in that topology the client was receiving a high quality of storage service.

Over time, a rate of storing client data in the data storage system (300) increases above a threshold used to determine whether nodes of the accelerator pool (310) are to be used for initial storage of the client data. In response to the client data storage rate increasing above the threshold, a data storage orchestrator (not shown) initiates a transition from storing the client data in the non-accelerator pool (300) to storing the client data in the accelerator pool (310).

To start the transition, the primary replica (424.2) is frozen to obtain a frozen primary replica (424.4) as shown in FIG. 4.2. While the secondary replica is frozen, client data is still stored in the primary data archive (422.2) and the secondary replica (426.2) continues to store copies of the client data after initial storage in the primary data archive (422.2).

After obtaining the frozen secondary replica (424.4), a tertiary replica (412.2) is instantiated in high performance node A (312) as shown in FIG. 4.3. When instantiated, the tertiary replica (412.2) is a copy of the frozen primary replica (424.4). Due to computing resource limitations for instantiating the tertiary replica (412.2), client data continues to be stored in the primary data archive (422.2) and copies of the client data are stored in the secondary replica (426.2) which causes the frozen primary replica (424.4) and the tertiary replica (412.2) to have different data from that of the primary data archive and primary replica.

After instantiating the tertiary replica (412.2), the tertiary replica (412.2) is updated to have similar data to the primary data archive (422.2) and the secondary replica (426.2). Consequently, an updated tertiary replica (412.4) is obtained as illustrated in FIG. 4.4 which is a copy of the primary data archive (422.2).

After updating the tertiary replica, the frozen primary replica (424.4) is deleted, the primary data archive (422.2) is modified to act as a primary replica (422.4), and the updated tertiary replica (412.4) is modified to act as the primary data archive (412.6) as shown in FIG. 4.5.

During the process illustrated in FIGS. 4.1-4.5, client data was continuously stored by the data storage system (300) while the internal storage topology was modified so that client data was first stored in the accelerator pool (310) and then stored in the non-accelerator pool (320).

End of Second Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device. The communication interface (512) may include a network adapter or other hardware element that supports communications via any type of networking technology/standard.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506).

Many different types of computing devices exist, and the aforementioned input and output device(s) may take other forms.

One or more embodiments of the invention may improve the field of distributed storage technology. Specifically, embodiments of the invention may improve the efficiency of distributed storage technology by allocating computing resources of the distributed storage topology to meet the needs of different clients. A data storage system in accordance with embodiments of the invention may automatically transition where client data is stored based on the data storage requirements of each client. Consequently, the data storage system may continuously modify the resources of the data storage system that are allocated for providing data storage services to each client. By doing so, clients with high performance data storage may be allocated commensurate resources of the data storage system to meet the client's needs.

Additionally, embodiments of the invention may improve the feasibility of transitioning clients between different storage resources by enabling the transitions to be performed client data is continuously stored. Thus, one or more embodiments of the invention may provide a data storage system that is able to transition clients between different storage resources without interrupting the client's use of the data storage services provided by the data storage system.

Thus, embodiments of the invention may address a technological problem that arises due to the technological nature of the environment. Specifically, embodiments of the invention may address the problem of intermittent availability of storage resources in a data storage system that is attempting to optimize the allocation of storage resources between clients. In contrast, such problems may not arise in a single computing system but are caused by the multiple, independently operating entities that exist in a distributed computing system.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of a configurable device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data storage system for managing storage of data from clients, comprising:
   a data storage comprising:
      an accelerator pool, and
      a non-accelerator pool; and
   a data storage orchestrator programmed to:
      identify a client assignment update event based on a change in use of the data storage by a client of the clients,
      make a determination that the client assignment update event is a promotion event, and
      in response to the determination:
         promote the client to move a primary data storage of the client from the non-accelerator pool to the accelerator pool,
      wherein moving the primary data storage of the client from the non-accelerator pool to the accelerator pool comprises:
         freezing a primary replica in the non-accelerator pool, wherein the primary replica is associated with the primary data storage of the client;
         instantiating a tertiary replica in a node of the accelerator pool by copying the frozen primary replica;
         updating the tertiary replica based on differential storage that occurred while instantiating the tertiary replica;
         suspending the client's use of a primary data archive of the client after updating the tertiary replica;
         assigning the tertiary replica as a new primary data archive of the client after updating the tertiary replica;
         starting the client's use of the new primary data archive of the client after assigning the tertiary replica as the new primary data archive of the client; and
         purging the primary data archive of the client.

2. The data storage system of claim 1, wherein the data storage orchestrator is further programmed to:
   identify a second client assignment update event based on a change in use of the data storage by a second client of the clients;
   make a second determination that the second client assignment update event is not a promotion event; and
   in response to the second determination:
      demote the client to move a primary data storage of the second client from the accelerator pool to the non-accelerator pool.

3. The data storage system of claim 2, wherein making the second determination that the second client assignment update event is not the promotion event comprises:
   performing monitoring of the use of the data storage by the second client over a predetermined period of time;
   making a third determination, based on the monitoring, that a rate of storing data by the second client in the data storage has decreased below a threshold; and
   determining that the client assignment update event is not the promotion event based on the third determination.

4. The data storage system of claim 3, wherein making the determination that the client assignment update event is the promotion event comprises:
   performing second monitoring the use of the data storage by the client over a second predetermined period of time;
   making a fourth determination, based on the second monitoring, that a rate of storing data by the client in the data storage has increased above a second threshold; and
   determining that the client assignment update event is the promotion event based on the fourth determination.

5. The data storage system of claim 2, wherein moving the primary data storage of the second client from the accelerator pool to the non-accelerator pool comprises:
   freezing a secondary replica in the non-accelerator pool, wherein the secondary replica is associated with the primary data storage of the second client;
   instantiating a tertiary replica in a node of the non-accelerator pool by copying the frozen secondary replica;

updating the tertiary replica based on differential storage that occurred while instantiating the tertiary replica;

suspending the second client's use of the primary data archive of the second client after updating the tertiary replica;

assigning the tertiary replica as a new primary data archive of the second client after updating the tertiary replica;

starting the second client's use of the new primary data archive of the second client after assigning the tertiary replica as the new primary data archive of the second client; and purging the primary data archive of the second client.

6. The data storage system of claim 1, wherein the accelerator pool comprises high performance nodes, wherein the non-accelerator pool comprises low performance nodes having fewer computing resources than the high performance nodes.

7. A method for managing storage of data from clients, comprising:

identifying, by a data orchestrator of a data storage system, a client assignment update event based on a change in use of a data storage of the data storage system by a client of the clients, wherein the data storage comprises an accelerator pool and a non-accelerator pool;

making a determination that the client assignment update event is a promotion event; and in response to the determination:

promoting the client to move a primary data storage of the client from the non-accelerator pool to the accelerator pool, wherein moving the primary data storage of the client from the non-accelerator pool to the accelerator pool comprises:

freezing a primary replica in the non-accelerator pool, wherein the primary replica is associated with the primary data storage of the client;

instantiating a tertiary replica in a node of the accelerator pool by copying the frozen primary replica;

updating the tertiary replica based on differential storage that occurred while instantiating the tertiary replica;

suspending the client's use of a primary data archive of the client after updating the tertiary replica;

assigning the tertiary replica as a new primary data archive of the client after updating the tertiary replica;

starting the client's use of the new primary data archive of the client after assigning the tertiary replica as the new primary data archive of the client; and purging the primary data archive of the client.

8. The method of claim 7, further comprising:

identifying a second client assignment update event based on a change in use of the data storage by a second client of the clients;

making a second determination that the second client assignment update event is not a promotion event; and in response to the second determination:

demoting the client to move a primary data storage of the second client from the accelerator pool to the non-accelerator pool.

9. The method of claim 8, wherein making the second determination that the second client assignment update event is not the promotion event comprises:

performing monitoring of the use of the data storage by the second client over a predetermined period of time;

making a third determination, based on the monitoring, that a rate of storing data by the second client in the data storage has decreased below a threshold; and determining that the client assignment update event is not the promotion event based on the third determination.

10. The method of claim 9, wherein making the determination that the client assignment update event is the promotion event comprises:

performing second monitoring the use of the data storage by the client over a second predetermined period of time;

making a fourth determination, based on the second monitoring, that a rate of storing data by the client in the data storage has increased above a second threshold; and determining that the client assignment update event is the promotion event based on the fourth determination.

11. The method of claim 8, wherein moving the primary data storage of the second client from the accelerator pool to the non-accelerator pool comprises:

freezing a secondary replica in the non-accelerator pool, wherein the secondary replica is associated with the primary data storage of the second client;

instantiating a tertiary replica in a node of the non-accelerator pool by copying the frozen secondary replica;

updating the tertiary replica based on differential storage that occurred while instantiating the tertiary replica;

suspending the second client's use of the primary data archive of the second client after updating the tertiary replica;

assigning the tertiary replica as a new primary data archive of the second client after updating the tertiary replica;

starting the second client's use of the new primary data archive of the second client after assigning the tertiary replica as the new primary data archive of the second client; and purging the primary data archive of the second client.

12. The method of claim 7, wherein the accelerator pool comprises high performance nodes, wherein the non-accelerator pool comprises low performance nodes having fewer computing resources than the high performance nodes.

13. A non-transitory computer readable medium comprising computer readable program code, which when executed by a computer processor enables the computer processor to perform a method for managing storage of data from clients, the method comprising:

identifying, by a data orchestrator of a data storage system, a client assignment update event based on a change in use of a data storage of the data storage system by a client of the clients, wherein the data storage comprises an accelerator pool and a non-accelerator pool;

making a determination that the client assignment update event is a promotion event; and in response to the determination:

promoting the client to move a primary data storage of the client from the non-accelerator pool to the accelerator pool, wherein moving the primary data storage of the client from the non-accelerator pool to the accelerator pool comprises:

freezing a primary replica in the non-accelerator pool, wherein the primary replica is associated with the primary data storage of the client;

instantiating a tertiary replica in a node of the accelerator pool by copying the frozen primary replica;

updating the tertiary replica based on differential storage that occurred while instantiating the tertiary replica;

suspending the client's use of a primary data archive of the client after updating the tertiary replica;

assigning the tertiary replica as a new primary data archive of the client after updating the tertiary replica;

starting the client's use of the new primary data archive of the client after assigning the tertiary replica as the new primary data archive of the client and purging the primary data archive of the client.

14. The non-transitory computer readable medium of claim 13, wherein the method further comprises:

identifying a second client assignment update event based on a change in use of the data storage by a second client of the clients;

making a second determination that the second client assignment update event is not a promotion event; and in response to the second determination:
demoting the client to move a primary data storage of the second client from the accelerator pool to the non-accelerator pool.

15. The non-transitory computer readable medium of claim 14, wherein making the second determination that the second client assignment update event is not the promotion event comprises:

performing monitoring of the use of the data storage by the second client over a predetermined period of time;

making a third determination, based on the monitoring, that a rate of storing data by the second client in the data storage has decreased below a threshold; and determining that the client assignment update event is not the promotion event based on the third determination.

16. The non-transitory computer readable medium of claim 15, wherein making the determination that the client assignment update event is the promotion event comprises:

performing second monitoring the use of the data storage by the client over a second predetermined period of time;

making a fourth determination, based on the second monitoring, that a rate of storing data by the client in the data storage has increased above a second threshold; and determining that the client assignment update event is the promotion event based on the fourth determination.

17. The non-transitory computer readable medium of claim 14, wherein the accelerator pool comprises high performance nodes, wherein the non-accelerator pool comprises low performance nodes having fewer computing resources than the high performance nodes.

18. The non-transitory computer readable medium of claim 14, wherein moving the primary data storage of the second client from the accelerator pool to the non-accelerator pool comprises:

freezing a secondary replica in the non-accelerator pool, wherein the secondary replica is associated with the primary data storage of the second client;

instantiating a tertiary replica in a node of the non-accelerator pool node by copying the frozen secondary replica;

updating the tertiary replica based on differential storage that occurred while instantiating the tertiary replica;

suspending the second client's use of the primary data archive of the second client after updating the tertiary replica;

assigning the tertiary replica as a new primary data archive of the second client after updating the tertiary replica;

starting the second client's use of the new primary data archive of the second client after assigning the tertiary replica as the new primary data archive of the second client; and purging the primary data archive of the second client.

* * * * *

UNITED STATES PATENT AND TRADEMARK OFFICE
CERTIFICATE OF CORRECTION

PATENT NO. : 10,740,023 B1
APPLICATION NO. : 16/261155
DATED : August 11, 2020
INVENTOR(S) : Dharmesh M. Patel, Rizwan Ali and Ravikanth Chaganti Page 1 of 1

It is certified that error appears in the above-identified patent and that said Letters Patent is hereby corrected as shown below:

In the Claims

Column 22, Line 23 in Claim 18, the word "node" should be deleted.

Signed and Sealed this
Twenty-seventh Day of October, 2020

Andrei Iancu
*Director of the United States Patent and Trademark Office*